United States Patent
Li et al.

(10) Patent No.: US 11,122,599 B2
(45) Date of Patent: Sep. 14, 2021

(54) ACKNOWLEDGEMENT MECHANISMS FOR UPLINK LOW LATENCY COMMUNICATIONS

(71) Applicant: QUALCOMM Incorporated, San Diego, CA (US)

(72) Inventors: Chong Li, Weehawken, NJ (US); Junyi Li, Chester, NJ (US)

(73) Assignee: QUALCOMM INCORPORATED, San Diego, CA (US)

( * ) Notice: Subject to any disclaimer, the term of this patent is extended or adjusted under 35 U.S.C. 154(b) by 124 days.

(21) Appl. No.: 16/117,908

(22) Filed: Aug. 30, 2018

(65) Prior Publication Data
US 2019/0075584 A1 Mar. 7, 2019

Related U.S. Application Data

(60) Provisional application No. 62/553,781, filed on Sep. 1, 2017.

(51) Int. Cl.
*H04W 72/12* (2009.01)
*H04L 1/18* (2006.01)
(Continued)

(52) U.S. Cl.
CPC ....... *H04W 72/1268* (2013.01); *H04L 1/0068* (2013.01); *H04L 1/1621* (2013.01); *H04L 1/1864* (2013.01); *H04L 5/0033* (2013.01); *H04L 5/0055* (2013.01); *H04B 7/00* (2013.01); *H04W 74/08* (2013.01)

(58) Field of Classification Search
None
See application file for complete search history.

(56) References Cited

U.S. PATENT DOCUMENTS

2018/0123765 A1* 5/2018 Cao .............. H04L 1/1819
2019/0098608 A1* 3/2019 Yi ................. H04L 5/0007
2019/0349971 A1* 11/2019 Yu .............. H04W 72/1273

FOREIGN PATENT DOCUMENTS

KR    20180063335 A    6/2018
WO    WO-2017122959 A1    7/2017

OTHER PUBLICATIONS

International Search Report and Written Opinion—PCT/US2018/049226—ISA/EPO—dated Dec. 13, 2018 (175954WO).
(Continued)

*Primary Examiner* — Saad Khawar
(74) *Attorney, Agent, or Firm* — Holland & Hart LLP

(57) ABSTRACT

Methods, systems, and devices for wireless communications are described for providing acknowledgements of grant-free uplink transmissions, which may in some cases be used for low latency communications. Approaches described herein include the use of per-user equipment (UE) acknowledgement resources assigned to UEs configured for grant-free uplink transmissions as well as the use of per-group acknowledgement resources assigned to groups of UEs configured for grant-free uplink transmissions. Dynamic puncturing of data in a shared downlink data channel may be used in the context of per-UE acknowledgement resource assignment. Corresponding grants of uplink transmission resources may be used in the context of per-group acknowledgement resources assignments.

30 Claims, 19 Drawing Sheets

(51) Int. Cl.
*H04L 5/00* (2006.01)
*H04L 1/00* (2006.01)
*H04L 1/16* (2006.01)
H04W 74/08 (2009.01)
H04B 7/00 (2006.01)

(56) References Cited

OTHER PUBLICATIONS

MCC Support: "Final Report of 3GPP TSG RAN WG1 #89 V1.0.0", 3GPP Draft, Final_Minutes_Report_RAN1#89_V100, 3rd Generation Partnership Project (3GPP), vol. RAN WG1, No. Prague, Czech Rep, Aug. 21, 2017-Aug. 25, 2017, Aug. 20, 2017 (Aug. 20, 2017), pp. 1-164.

* cited by examiner

| ACK or NACK? | Grant? | Retransmit? |
|---|---|---|
| ACK | No | No |
| ACK | Yes | Yes (via granted resoures) |
| NACK | Yes | Yes (via granted resoures) |
| NACK | No | Yes (via another grant-free uplink transmission) |

ACKNOWLEDGEMENT MECHANISMS FOR UPLINK LOW LATENCY COMMUNICATIONS

CROSS REFERENCES

The present application for patent claims the benefit of U.S. Provisional Patent Application No. 62/553,781 by Li et al., entitled "ACKNOWLEDGEMENT MECHANISMS FOR UPLINK LOW LATENCY COMMUNICATIONS," filed Sep. 1, 2017, assigned to the assignee hereof, and expressly incorporated by reference herein.

BACKGROUND

The following relates generally to wireless communication, and more specifically to acknowledgement mechanisms for uplink low latency communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Some wireless communications systems may be to configured to support multiple classes or use cases of communications. For example, a wireless communications system may support ultra-reliable and low latency communications (URLLC), which may be used for critical functions (e.g., mission critical functions), and may also support enhanced mobile broadband (eMBB) communications, which may be used for applications in which high data rate, high capacity, and/or wide-area coverage is desired but for which latency and reliability are less critical than in URLLC. To support low latency communications, such as URLLC, the system may support grant-free uplink transmissions from a UE—e.g., uplink transmissions via transmission resources that have not been granted to the UE by the system. Methods to provide acknowledgements of grant-free uplink transmissions are desired.

SUMMARY

The described techniques relate to improved methods, systems, devices, or apparatuses that support acknowledgement mechanisms for uplink low latency communications. In some examples, a base station may assign to a user equipment (UE) configured for low latency communications, which may be referred to as an ultra-reliable and low latency communications (URLLC) UE, an acknowledgement resource specific to the URLLC UE—e.g., a dedicated acknowledgment resource. The dedicated acknowledgement resource may, however, be part of a shared downlink data channel, and the dedicated acknowledgement resource may remain available for downlink data transmissions to one or more other UEs when not carrying an acknowledgement for the URLLC UE. When the URLLC UE transmits a grant-free transmission that is received by the base station, the base station may puncture any downlink data transmission scheduled on the dedicated acknowledgment resource for another UE and instead use the dedicated acknowledgement resource to send an acknowledgement of the grant-free transmission to the URLLC UE. The base station may also send to any UE for which the punctured downlink data transmission was scheduled an indication that the scheduled downlink data was punctured, and as part of or in addition to the indication of puncturing, may also send to any such UE an indication of one or more transmissions resources via which the base station will transmit the punctured data. Thus, a dedicated acknowledgement resource may be provided to a URLLC UE but the underlying transmission resource may remain available when not utilized for acknowledgements, which may improve resource efficiency.

In additional examples, a base station may assign to a URLLC UE an acknowledgement resource that is shared with one or more other URLLC UEs—e.g., an acknowledgement resource that is assigned to a group of URLLC UEs, which may be referred to as a group acknowledgment resource. Though the group acknowledgement resource is shared by the multiple URLLC UEs in the group, the base station may transmit grants of uplink transmission resources along with acknowledgements to avoid misinterpretation of acknowledgements sent via the group acknowledgement resource. For example, when the base station simultaneously receives grant-free transmissions from multiple URLLC UEs from the group, the base station may use the group acknowledgment resource to send an acknowledgement of one of the received grant-free transmissions, and the base station may also send a grant of uplink transmission resources to any other URLLC UE in the group from which a grant-free transmission was received but for which no acknowledgement was sent. The base station may send each grant of uplink transmission resources in a search space of a downlink control channel, and the URLLC UEs in the group may be configured to monitor the search space after sending a grant-free transmission. URLLC UEs to which a group acknowledgment resource has been assigned may use information obtained via the group acknowledgment resource as well as information obtained via the search space to interpret an acknowledgement received via the group acknowledgment resource. Thus, a single acknowledgement resource may be shared by a group of URLLC UEs, which may improve resource efficiency while maintaining a sufficient level of reliability.

A method of wireless communication is described. The method may include assigning an acknowledgement resource to a UE, the acknowledgment resource comprising a shared downlink data channel resource also assigned to one or more other UEs for a downlink data transmission, receiving, from the UE, a grant-free uplink transmission, and transmitting, to the UE via the acknowledgement resource, an acknowledgement of the grant-free uplink transmission, the acknowledgement puncturing the downlink data transmission.

An apparatus for wireless communication is described. The apparatus may include means for assigning an acknowledgement resource to a UE, the acknowledgment resource comprising a shared downlink data channel resource also assigned to one or more other UEs for a downlink data transmission, receiving, from the UE, a grant-free uplink transmission, and transmitting, to the UE via the acknowledgement resource, an acknowledgement of the grant-free uplink transmission, the acknowledgement puncturing the downlink data transmission.

Another apparatus for wireless communication is described. The apparatus may include a processor, memory in electronic communication with the processor, and instructions stored in the memory. The instructions may be operable to cause the processor to assign an acknowledgement resource to a UE, the acknowledgment resource comprising a shared downlink data channel resource also assigned to one or more other UEs for a downlink data transmission, receive, from the UE, a grant-free uplink transmission, and transmit, to the UE via the acknowledgement resource, an acknowledgement of the grant-free uplink transmission, the acknowledgement puncturing the downlink data transmission.

A non-transitory computer readable medium for wireless communication is described. The non-transitory computer-readable medium may include instructions operable to cause a processor to assign an acknowledgement resource to a UE, the acknowledgment resource comprising a shared downlink data channel resource also assigned to one or more other UEs for a downlink data transmission, receive, from the UE, a grant-free uplink transmission, and transmit, to the UE via the acknowledgement resource, an acknowledgement of the grant-free uplink transmission, the acknowledgement puncturing the downlink data transmission.

Some examples of the method, apparatus, and non-transitory computer-readable medium described above may further include processes, features, means, or instructions for receiving at least one additional grant-free uplink transmission from one or more additional UEs apart from the UE, and transmitting a grant of uplink transmission resources in response to the grant-free uplink transmission or the at least one other grant-free uplink transmission from the one or more additional UEs apart from the UE that is unsuccessfully decoded. Some examples of the method, apparatus, and non-transitory computer-readable medium described above may further include processes, features, means, or instructions for transmitting the grant of uplink transmission resources within a search space in a control channel along with an indication of whether the grant of uplink transmission resources is for the UE or for the one or more additional UEs apart from the UE.

Some examples of the method, apparatus, and non-transitory computer-readable medium described above may further include processes, features, means, or instructions for transmitting to the one or more other UEs an indication of the puncturing. Some examples of the method, apparatus, and non-transitory computer-readable medium described above may further include processes, features, means, or instructions for transmitting the acknowledgement and transmitting the indication in a same transmission time interval. Some examples of the method, apparatus, and non-transitory computer-readable medium described above may further include processes, features, means, or instructions for transmitting the acknowledgement in a first transmission time interval and transmitting the indication in a second transmission time interval, the second transmission time interval subsequent to the first transmission time interval. Some examples of the method, apparatus, and non-transitory computer-readable medium described above may further include processes, features, means, or instructions for transmitting the indication via a control channel, a dedicated indication channel, or a combination thereof.

In some examples of the method, apparatus, and non-transitory computer-readable medium described above, transmitting the indication of the puncturing comprises transmitting information regarding a subsequent transmission, the subsequent transmission comprising data punctured by the acknowledgement.

Some examples of the method, apparatus, and non-transitory computer-readable medium described above may further include processes, features, means, or instructions for receiving data from the UE via one or more transmission resources indicated by the acknowledgement.

In some examples of the method, apparatus, and non-transitory computer-readable medium described above, assigning, to the UE, the acknowledgement resource comprises semi-persistently assigning the acknowledgement resource to the UE. In some examples, assigning, to the UE, the acknowledgement resource comprises dynamically assigning the acknowledgement resource to the UE.

In some examples of the method, apparatus, and non-transitory computer-readable medium described above, the grant-free uplink transmission is for ultra-reliable communications, low latency communications, or a combination thereof. In some examples, the downlink data transmission is for enhanced mobile broadband communications. In some examples, the shared downlink data channel resource comprises a physical downlink shared channel (PDSCH).

A method of wireless communication is described. The method may include receiving an assignment of an acknowledgement resource, the acknowledgment resource comprising a shared downlink data channel resource available for a downlink data transmission to one or more other user equipments (UEs), transmitting a grant-free uplink transmission, and monitoring the acknowledgement resource for an acknowledgement of the grant-free uplink transmission.

An apparatus for wireless communication is described. The apparatus may include means for receiving an assignment of an acknowledgement resource, the acknowledgment resource comprising a shared downlink data channel resource, transmitting a grant-free uplink transmission, and monitoring the acknowledgement resource for an acknowledgement of the grant-free uplink transmission.

Another apparatus for wireless communication is described. The apparatus may include a processor, memory in electronic communication with the processor, and instructions stored in the memory. The instructions may be operable to cause the processor to receive an assignment of an acknowledgement resource, the acknowledgment resource comprising a shared downlink data channel resource available for a downlink data transmission to one or more other user equipments (UEs), transmit a grant-free uplink transmission, and monitor the acknowledgement resource for an acknowledgement of the grant-free uplink transmission.

A non-transitory computer readable medium for wireless communication is described. The non-transitory computer-readable medium may include instructions operable to cause a processor to receive an assignment of an acknowledgement resource, the acknowledgment resource comprising a shared downlink data channel resource, transmit a grant-free uplink transmission, and monitor the acknowledgement resource for an acknowledgement of the grant-free uplink transmission.

Some examples of the method, apparatus, and non-transitory computer-readable medium described above may further include processes, features, means, or instructions for receiving the acknowledgment, wherein the acknowledgement comprises a negative acknowledgement indicating that the grant-free uplink transmission was not successfully received, and retransmitting data corresponding to the grant-free uplink transmission. In some examples, retransmitting data corresponding to the grant-free uplink transmission comprises retransmitting data corresponding to the grant-free uplink transmission using one or more transmission resources indicated by the acknowledgement.

Some examples of the method, apparatus, and non-transitory computer-readable medium described above may further include processes, features, means, or instructions for receiving the acknowledgment, wherein the acknowledgement comprises an affirmative acknowledgement that the grant-free uplink transmission was successfully received, and transmitting data using one or more transmission resources indicated by the acknowledgement.

In some examples of the method, apparatus, and non-transitory computer-readable medium described above, receiving the assignment of the acknowledgement resource comprises receiving a semi-persistent assignment of the acknowledgement resource. In some examples, receiving the assignment of the acknowledgement resource comprises receiving a dynamic assignment of the acknowledgement resource. In some examples, the shared downlink data channel resource comprises a PDSCH.

A method of wireless communication is described. The method may include receiving an assignment for a shared downlink data channel resource, the shared downlink data channel resource also assigned to at least one other UE as an acknowledgment resource, receiving a data transmission on the shared downlink data channel resource, receiving an indication that data intended for the UE was punctured by the received data transmission, and receiving a subsequent transmission comprising the punctured data.

An apparatus for wireless communication is described. The apparatus may include means for receiving an assignment for a shared downlink data channel resource, the shared downlink data channel resource also assigned to at least one other UE as an acknowledgment resource, receiving a data transmission on the shared downlink data channel resource, receiving an indication that data intended for the UE was punctured by the received data transmission, and receiving a subsequent transmission comprising the punctured data.

Another apparatus for wireless communication is described. The apparatus may include a processor, memory in electronic communication with the processor, and instructions stored in the memory. The instructions may be operable to cause the processor to receive an assignment for a shared downlink data channel resource, the shared downlink data channel resource also assigned to at least one other UE as an acknowledgment resource, receive a data transmission on the shared downlink data channel resource, receive an indication that data intended for the UE was punctured by the received data transmission, and receive a subsequent transmission comprising the punctured data.

A non-transitory computer readable medium for wireless communication is described. The non-transitory computer-readable medium may include instructions operable to cause a processor to receive an assignment for a shared downlink data channel resource, the shared downlink data channel resource also assigned to at least one other UE as an acknowledgment resource, receive a data transmission on the shared downlink data channel resource, receive an indication that data intended for the UE was punctured by the received data transmission, and receive a subsequent transmission comprising the punctured data.

Some examples of the method, apparatus, and non-transitory computer-readable medium described above may further include processes, features, means, or instructions for discarding the data transmission based at least in part on the indication. Some examples of the method, apparatus, and non-transitory computer-readable medium described above may further include processes, features, means, or instructions for receiving the indication via a control channel, a dedicated indication channel, or a combination thereof.

In some examples of the method, apparatus, and non-transitory computer-readable medium described above, receiving the indication comprises receiving information regarding one or more transmission resources to be used for the subsequent transmission. In some examples, the shared downlink data channel resource comprises a PDSCH.

A method of wireless communication is described. The method may include assigning an acknowledgement resource to a UE group comprising a first UE and one or more additional UEs, the acknowledgment resource comprising a shared downlink data channel resource, receiving a first grant-free uplink transmission from the first UE and at least one additional grant-free uplink transmission from the one or more additional UEs, transmitting, via the acknowledgement resource, an acknowledgement of whether one of the first grant-free uplink transmission or the at least one additional grant-free uplink transmission is successfully decoded, and transmitting a grant of uplink transmission resources for retransmission of data corresponding to any of the first grant-free uplink transmission or the at least one other grant-free uplink transmission that is unsuccessfully decoded.

An apparatus for wireless communication is described. The apparatus may include means for assigning an acknowledgement resource to a UE group comprising a first UE and one or more additional UEs, the acknowledgment resource comprising a shared downlink data channel resource, receiving a first grant-free uplink transmission from the first UE and at least one additional grant-free uplink transmission from the one or more additional UEs, transmitting, via the acknowledgement resource, an acknowledgement of whether one of the first grant-free uplink transmission or the at least one additional grant-free uplink transmission is successfully decoded, and transmitting a grant of uplink transmission resources for retransmission of data corresponding to any of the first grant-free uplink transmission or the at least one other grant-free uplink transmission that is unsuccessfully decoded.

Another apparatus for wireless communication is described. The apparatus may include a processor, memory in electronic communication with the processor, and instructions stored in the memory. The instructions may be operable to cause the processor to assign an acknowledgement resource to a UE group comprising a first UE and one or more additional UEs, the acknowledgment resource comprising a shared downlink data channel resource, receive a first grant-free uplink transmission from the first UE and at least one additional grant-free uplink transmission from the one or more additional UEs, transmit, via the acknowledgement resource, an acknowledgement of whether one of the first grant-free uplink transmission or the at least one additional grant-free uplink transmission is successfully decoded, and transmit a grant of uplink transmission resources for retransmission of data corresponding to any of the first grant-free uplink transmission or the at least one other grant-free uplink transmission that is unsuccessfully decoded.

A non-transitory computer readable medium for wireless communication is described. The non-transitory computer-readable medium may include instructions operable to cause a processor to assign an acknowledgement resource to a UE group comprising a first UE and one or more additional UEs, the acknowledgment resource comprising a shared downlink data channel resource, receive a first grant-free uplink transmission from the first UE and at least one additional grant-free uplink transmission from the one or more additional UEs, transmit, via the acknowledgement resource, an acknowledgement of whether one of the first grant-free uplink transmission or the at least one additional grant-free uplink transmission is successfully decoded, and transmit a grant of uplink transmission resources for retransmission of data corresponding to any of the first grant-free uplink transmission or the at least one other grant-free uplink transmission that is unsuccessfully decoded.

In some examples of the method, apparatus, and non-transitory computer-readable medium described above, transmitting the grant of uplink transmission resources for retransmission of data comprises transmitting the grant of uplink transmission resources within a search space in a control channel along with an indication of whether the grant of uplink transmission resources is for the first UE or for the one or more additional UEs. In some examples, the control channel comprises a physical downlink control channel (PDCCH). In some examples, assigning the acknowledgement resource comprises semi-persistently assigning the acknowledgement resource to the UE group. In some examples, the shared downlink data channel resource comprises a PDSCH. In some examples, the first grant-free uplink transmission and the at least one additional grant-free uplink transmission are for ultra-reliable communications, low latency communications, or a combination thereof.

Some examples of the method, apparatus, and non-transitory computer-readable medium described above may further include processes, features, means, or instructions for transmitting the acknowledgement and transmitting the grant of uplink transmission resources using a single time transmission interval.

A method of wireless communication is described. The method may include receiving an assignment of an acknowledgement resource, the acknowledgment resource comprising a shared downlink data channel resource also assigned to one or more other UEs, transmitting a grant-free uplink transmission, receiving an acknowledgement on the acknowledgement resource, monitoring a search space in a control channel for a grant of uplink transmission resources for retransmission of data corresponding to the grant-free uplink transmission, and determining, based at least in part on the monitoring, whether the acknowledgement indicates a successful decode of the grant-free uplink transmission or an unsuccessful decode of the grant-free uplink transmission.

An apparatus for wireless communication is described. The apparatus may include means for receiving an assignment of an acknowledgement resource, the acknowledgment resource comprising a shared downlink data channel resource also assigned to one or more other UEs, transmitting a grant-free uplink transmission, means for receiving an acknowledgement on the acknowledgement resource, monitoring a search space in a control channel for a grant of uplink transmission resources for retransmission of data corresponding to the grant-free uplink transmission, and determining, based at least in part on monitoring the search space, whether the acknowledgement indicates a successful decode of the grant-free uplink transmission or an unsuccessful decode of the grant-free uplink transmission.

Another apparatus for wireless communication is described. The apparatus may include a processor, memory in electronic communication with the processor, and instructions stored in the memory. The instructions may be operable to cause the processor to receive an assignment of an acknowledgement resource, the acknowledgement resource comprising a shared downlink data channel resource also assigned to one or more other UEs, transmit a grant-free uplink transmission, receive an acknowledgement on the acknowledgement resource, monitor a search space in a control channel for a grant of uplink transmission resources for retransmission of data corresponding to the grant-free uplink transmission, and determine, based at least in part on monitoring the search space, whether the acknowledgement indicates a successful decode of the grant-free uplink transmission or an unsuccessful decode of the grant-free uplink transmission.

A non-transitory computer readable medium for wireless communication is described. The non-transitory computer-readable medium may include instructions operable to cause a processor to receive an assignment of an acknowledgement resource, the acknowledgment resource comprising a shared downlink data channel resource also assigned to one or more other UEs, transmit a grant-free uplink transmission, receive an acknowledgement on the acknowledgement resource, monitor a search space in a control channel for a grant of uplink transmission resources for retransmission of data corresponding to the grant-free uplink transmission, and determine, based at least in part on the monitoring, whether the acknowledgement indicates a successful decode of the grant-free uplink transmission or an unsuccessful decode of the grant-free uplink transmission.

Some examples of the method, apparatus, and non-transitory computer-readable medium described above may further include processes, features, means, or instructions for determining that the acknowledgement indicates an unsuccessful decode of the grant-free uplink transmission based at least in part on determining that the search space includes a grant of uplink transmission resources for retransmission of data corresponding to the grant-free uplink transmission. Some examples of the method, apparatus, and non-transitory computer-readable medium described above may further include processes, features, means, or instructions for retransmitting data corresponding to the grant-free uplink transmission using uplink transmission resources granted by the grant of uplink transmission resources. Some examples of the method, apparatus, and non-transitory computer-readable medium described above may further include processes, features, means, or instructions for determining that the acknowledgement indicates a successful decode of the grant-free uplink transmission based at least in part on determining that the search space lacks a grant of uplink transmission resources for retransmission of data corresponding to the grant-free uplink transmission.

Some examples of the method, apparatus, and non-transitory computer-readable medium described above may further include processes, features, means, or instructions for retransmitting data corresponding to the grant-free uplink transmission via subsequent grant-free uplink transmissions prior to a termination event, wherein the termination event comprises a threshold number of subsequent grant-free uplink transmissions, receipt of the acknowledgement, or a combination thereof.

In some examples of the method, apparatus, and non-transitory computer-readable medium described above, monitoring the search space in the control channel for the grant of uplink transmission resources comprises identifying within the search space a potential grant of uplink transmission resources for retransmission of data corresponding to the grant-free uplink transmission, and evaluating a UE identifier associated with the potential grant. In some examples, receiving the assignment of the acknowledgement resource comprises receiving a semi-persistent assignment of the acknowledgement resource. In some examples, the shared downlink data channel resource comprises a PDSCH. In some examples, the control channel comprises a PDCCH.

Some examples of the method, apparatus, and non-transitory computer-readable medium described above may further include processes, features, means, or instructions for receiving the acknowledgement and receiving the grant within a single time transmission interval.

DETAILED DESCRIPTION

Figure 1:
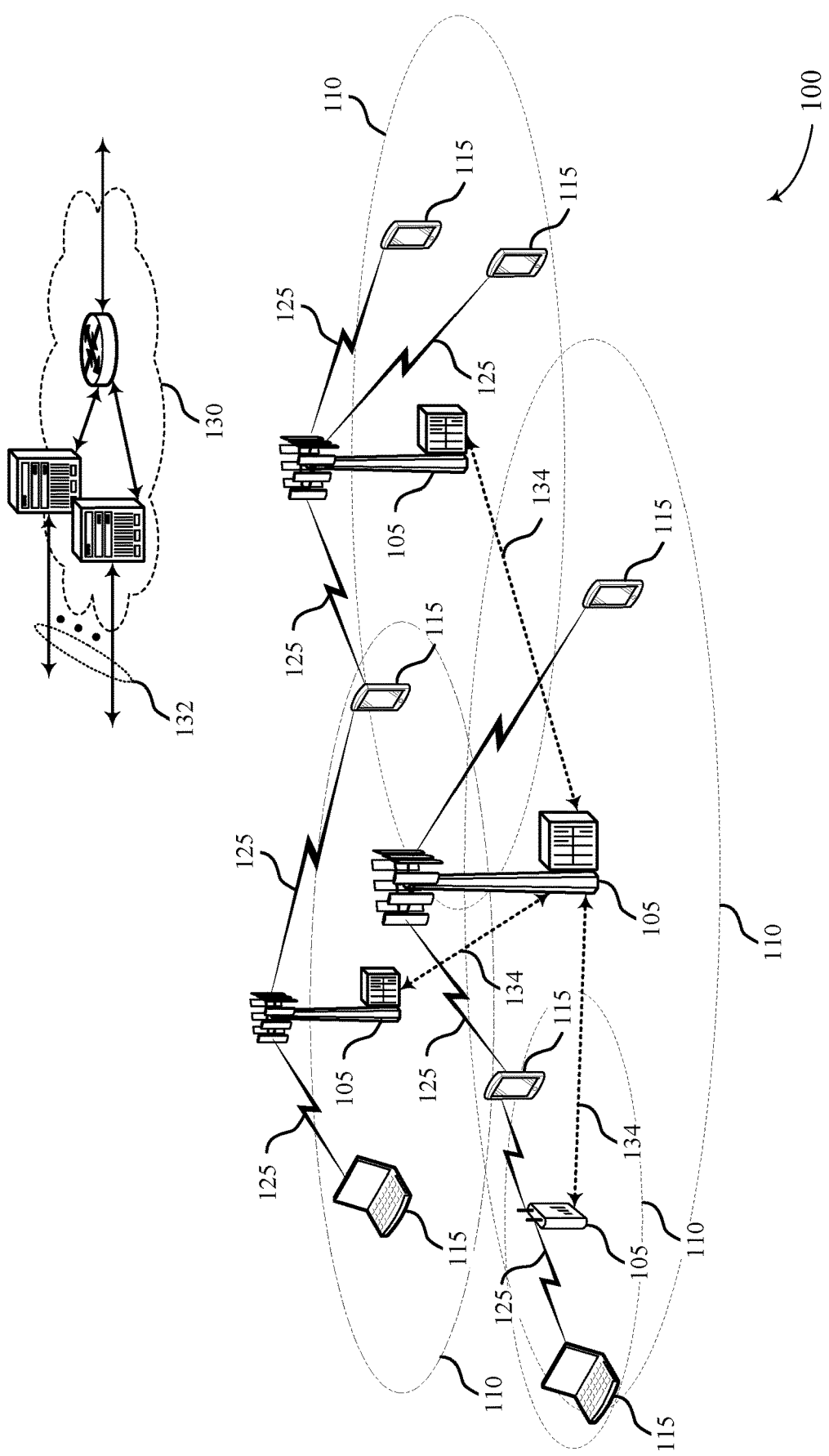
FIG. 1 illustrates an example of a system for wireless communications that supports acknowledgement mechanisms for uplink low latency communications in accordance with aspects of the present disclosure.

Some wireless communications systems, such as, for example, fifth generation (5G) or New Radio (NR) systems, may support multiple classes or use cases of communications. Different classes of communications may have different latency requirements. For example, some communications may be low latency communications with strict latency requirements, while other communications may have relatively lax latency requirements. Low latency communications may be used for use cases in which excess latency could have adverse consequences, such as adverse safety consequences. For example, self-driving vehicles or wirelessly controlled industrial equipment may rely on low latency communications. Some low latency communications may also be subject to strict reliability requirements—e.g., the communications must be supported not only to ensure low latency but also to ensure high reliability—and these may be referred to as ultra-reliable and low latency communications (URLLC). The techniques described herein may be described in terms of URLLC communications, but it should be understood that the techniques described herein are applicable to low latency communications in general, regardless of whether such communications are also ultra-reliable.

To reduce latency, a user equipment (UE) configured for low latency or URLLC communications, which may be referred to herein as a URLLC UE, may be configured to send grant-free uplink transmissions. That is, a URLLC UE may be configured to send uplink data transmissions to a base station via one or more transmission resources that have not been granted to the UE by the base station. Sending data via a grant-free uplink transmission may beneficially reduce latency compared to, for example, requesting a grant from the base station (e.g., sending a scheduling request to the base station), waiting for the base station to send the grant, and then sending the data to the base station via the granted transmission resources. Sending data via a grant-free uplink transmission may, however, adversely increase a probability of collision with another uplink transmission—e.g., because the grant-free uplink transmission is sent via a transmission resource that has not been granted to the URLLC UE by the base station, one or more other uplink transmissions may be sent by another UE using the same transmission resource (e.g., at the same time, frequency, etc.). For example, a grant-free uplink transmission may collide with another grant-free uplink transmission sent by another URLLC UE. As another example, a grant-free uplink transmission may collide with an uplink data transmission sent by a different UE to which the base station previously granted the underlying transmission resource.

To compensate for increased collision probabilities and other concerns, a URLLC UE configured to transmit data via a grant-free uplink transmission may be configured to retransmit the same data via successive grant-free uplink transmissions up to some maximum number of repetitions until either the URLLC UE receives an acknowledgment from a base station indicating a successful reception and decode of the grant-free uplink transmission by the base station. Also the URLLC UE may receive a grant from a base station of uplink transmission resources that the URLLC UE may use to retransmit the data in granted fashion, or until the occurrence of some other termination event.

Grant-free uplink transmissions from URLLC UEs may occur in a bursty and unpredictable fashion. For example, the base station may not be able to predict when it will receive grant-free uplink transmissions and may receive multiple grant-free uplink transmissions from multiple URLLC UEs simultaneously (as used herein, simultaneous means such that the same time resource would be used for corresponding acknowledgements; e.g., a same transmission time interval). The possibly bursty and unpredictable nature of grant-free uplink transmissions may complicate the ability of the base station to send acknowledgements for grant-free uplink transmissions (e.g., affirmative acknowledgements indicating successful receptions and decodes of grant-free uplink transmissions, which may be referred to as ACKs, or negative acknowledgements indicating unsuccessful receptions and decodes grant-free uplink transmissions, which may be referred to as NACKs). If the base station reserves a dedicated acknowledgement resource for each URLLC UE served by the base station—e.g., for each URLLC UE, reserves a dedicated downlink transmission resource exclusively for transmitting acknowledgements to that URLLC UE—some or all of the reserved downlink transmission resources may go largely unused. Thus, reserving a dedicated acknowledgement resource for each URLLC UE served by the base station may be wasteful of downlink transmission resources. But if the base station does not reserve a dedicated acknowledgement resource for each URLLC UE served by the base station, an unacceptable probability of acknowledgment collisions may exist. For example, if the base station assigns the same downlink transmission resource as an acknowledgement resource for two URLLC UEs, the two URLLC UEs may send grant-free uplink transmissions simultaneously and subsequently monitor the same shared acknowledgement resource. This may provide unacceptable level of reliability as, for example, the base station may successfully decode one of the simultaneous grant-free uplink transmissions but not the other—in such scenario, if the base station sends an ACK on the shared acknowledgement resource, the URLLC UE that sent the unsuccessfully decoded grant-free uplink transmission may misinterpret the ACK as corresponding to its grant-free uplink transmission and thus may not retransmit.

Improved reliability and resource efficiency (e.g., efficiency with respect to time, frequency, code, spatial, or spectrum resources) may therefore be achieved by improved acknowledgement mechanisms for uplink low latency communications, such as grant-free transmissions by URLLC UEs. For example, a base station may assign to each URLLC UE served by the base station an acknowledgement resource specific to the URLLC UE—e.g., a downlink transmission resource not also assigned as an acknowledgement resource for any other URLLC UE—which may be referred to herein as a dedicated acknowledgement resource. The dedicated acknowledgement resource may, however, remain available for downlink transmissions other than acknowledgements of grant-free transmissions, thus avoiding wasting the resource when not used to send an acknowledgement to the assigned URLLC UE. As another example, a base station may assign a single acknowledgement resource to a group of URLLC UEs—e.g., a downlink transmission resource via which the base station will transmit an acknowledgement for any grant-free transmission from any URLLC UE in the group— which may be referred to herein as a group acknowledgement resource. The base station may, however, in the event of receiving simultaneous grant-free uplink transmissions from multiple URLLC UEs assigned the same group acknowledgement resource, transmit an acknowledgement for one of the simultaneous grant-free uplink transmissions via the group acknowledgement resource and transmit a grant of uplink transmission resources corresponding to each of the other simultaneous grant-free uplink transmissions, thus avoiding misinterpretation of the acknowledgement sent via the group acknowledgement resource. Further, techniques using dedicated acknowledgement resources and using group acknowledgement resources may be combined.

Aspects of the disclosure are initially described in the context of a wireless communications system. Various examples of process flows for improved acknowledgement mechanisms for uplink low latency communications are then described. Aspects of the disclosure are further illustrated by and described with reference to apparatus diagrams, system diagrams, and flowcharts that relate to acknowledgement mechanisms for uplink low latency communications.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like. Some of the UEs 115 described herein may be configured to support low latency communications, ultra-reliable communications, or a combination thereof and may be referred to herein as URLLC UEs.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB) communications, URLLC communications, or others) that may support different classes or uses cases of communications. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, an MTC device, an eMBB device, a URLLC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions. In some cases, a single physical device may support multiple use cases of communications—e.g., a single UE 115 may support URLLC communications as well another use case such as eMBB communications or MTC communications.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30{,}720{,}000$ seconds. Time intervals of a communications resource may be organized according to radio frames each having a duration of 10 milliseconds (ms), where the frame period may be expressed as $T_f=307{,}200\ T_s$. The radio frames may be identified by a system frame number (SFN) ranging from 0 to 1023. Each frame may include 10 subframes numbered from 0 to 9, and each subframe may have a duration of ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. In some cases, URLLC communications, such as grant-free uplink transmission and corresponding acknowledgements, may use mini slots as a transmission time intervals—e.g., a UE 115 may send a grant-free uplink transmission may in a first mini slot, and a base station may send a responsive acknowledgement in the immediately subsequent mini slot—which may reduce latency. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

Figure 2:
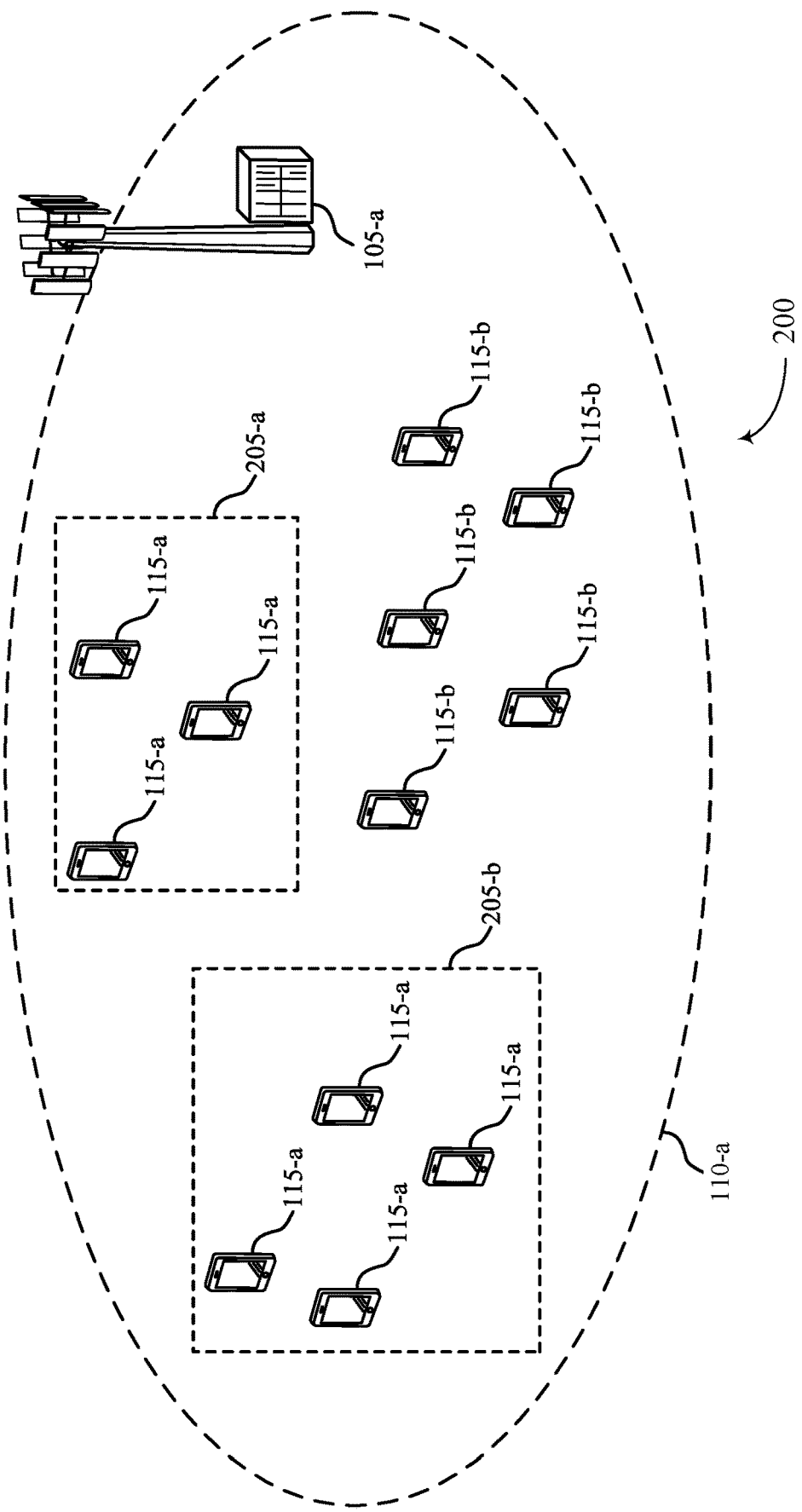
FIG. 2 illustrates an example of a system for wireless communications that supports acknowledgement mechanisms for uplink low latency communications in accordance with aspects of the present disclosure.

FIG. 2 illustrates an example of a wireless communications system 200 that supports acknowledgement mechanisms for uplink low latency communications in accordance with various aspects of the present disclosure. In some examples, wireless communications system 200 may comprise aspects of wireless communications system 100. Wireless communications system 200 includes base station 105-a, which serves coverage area 110-a (sometimes referred to as a cell). Wireless communications system 200 also includes a plurality of URLLC UEs 115-a and a plurality of non-URLLC UEs 115-b, which are each located within coverage area 110-a and each served by base station 105-a.

FIG. 2 illustrates URLLC UEs 115-a as clustered in two geographic areas and non-URLLC UEs 115-b as clustered in another geographic area. A first group 205-a of URLLC UEs 115-a is clustered in a first geographic area, and a second group 205-b of URLLC UEs 115-a is clustered in a second area. It is to be understood, however, that this is for illustrative purposes only. URLLC UEs 115-a and non-URLLC UEs 115-b may be geographically distributed in any manner. For example, URLLC UEs 115-a and non-URLLC UEs 115-b may be intermingled, and, in some cases, a single UE 115 may support both URLLC and non-URLLC communications and thus act as either a URLLC UE 115-a or a non-URLLC UE 115-b.

As explained herein, in some cases base station 105-a may assign a dedicated acknowledgement resource to each URLLC UE 115-a served by base station 105-a. For example, in the context of wireless communications system 200, base station 105-a may assign a total of seven dedicated acknowledgement resources, one to each URLLC UE 115-a served by base station 105-a. It is to be understood that other numbers of URLLC UEs 115-a are possible. An example in which base station 105-a assigns a dedicated acknowledgement resource to a URLLC UE 115-a is described below in reference to FIG. 3.

As also exampled herein, in some cases, base station 105-*a* may assign a group acknowledgement resource to a group 205 of URLLC UEs 115-*a* served by base station 105-*a*. For example, in the context of wireless communications system 200, base station 105-*a* may assign a first group acknowledgement resource to group 205-*a* and a second group acknowledgement resource to group 205-*b*. It is to be understood that other numbers of groups 205 of URLLC UEs 115-*a* are possible. It is further to be understood that base station 105-*a* may assign a group acknowledgement resource to any number of URLLC UEs 115-*a*, thus treating them as a group 205. It is further to be understood that groups 205 need not be based on location but can alternatively or additionally be based on other factors, either alone or in combination, such as data demand, channel quality, etc. An example in which base station 105-*a* assigns a group acknowledgement resource to multiple URLLC UEs 115-*a* is described below in reference to FIG. 4.

In some cases, base station 105-*a* may assign acknowledgement resources to URLLC UEs 115 in round-robin fashion. For example, base station 105-*a* may assign a dedicated acknowledgement resource to each URLLC UE 115-*a* served by base station 105-*a* up to some maximum number of dedicated acknowledgement resources. The base station 105-*a* may thereafter assign to any URLLC UE 115 that subsequently enters coverage area 110-*a* an acknowledgement resource that base station 105-*a* already assigned to one of the other URLLC UEs 115-*a*, thereby converting what was a dedicated acknowledgement resource into a group acknowledgement resource. Thus, the number of dedicated assignment resources and group assignment resources assigned by base station 105-*a* may fluctuate as the number of number of URLLC UEs 115-*a* served by base station 105-*a* fluctuates, and the membership of groups 205 may similarly fluctuate.

An acknowledgement resource—either a dedicated acknowledgment resource or a group acknowledgment resource—may comprise any downlink transmission resource capable of carrying an acknowledgement (ACK or NACK) from base station 105-*a* to a URLLC UE 115-*a* to which it is assigned. For example, an acknowledgement resource may comprise a downlink RB and scrambling code combination. In some examples, an acknowledgement resource may comprise a downlink data channel resource, such as a physical downlink shared channel (PDSCH) resource. Upon receipt of a grant-free uplink transmission, base station 105-*a* may subsequently send an acknowledgement of the grant-free uplink transmission via the acknowledgement resource. In some examples, base station 105-*a* may send the acknowledgement of the grant-free uplink transmission via the acknowledgement resource in a time transmission interval immediately subsequent to the time transmission interval in which the grant-free uplink transmission was received, and the relevant time transmission intervals may comprise either a slot or mini-slot.

Figure 3:
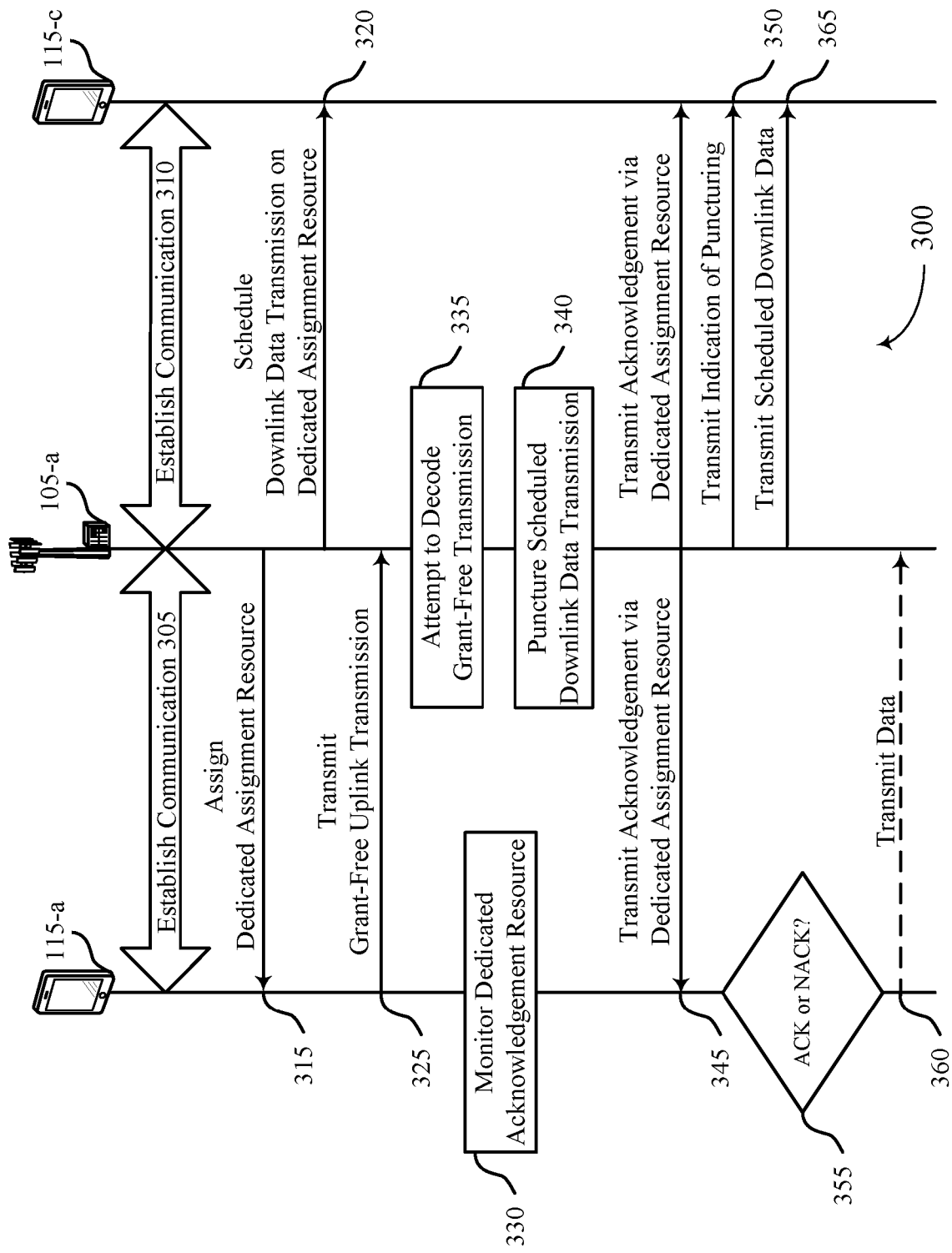
FIG. 3 illustrates an example of a process flow that supports acknowledgement mechanisms for uplink low latency communications in accordance with aspects of the present disclosure.

FIG. 3 illustrates an example of a process flow 300 in which base station 105-*a* assigns a dedicated acknowledgement resource to a URLLC UE 115-*a* in accordance with various aspects of the present disclosure. In some examples, process flow 300 may be implemented by aspects of wireless communications system 100 or wireless communications system 200.

At step 305, base station 105-*a* and URLLC UE 115-*a* may establish communication according to established connection establishment techniques for the wireless communications system.

At step 310, base station 105-*a* and another UE 115-*c* may also establish communication according to established connection establishment techniques for the wireless communications system. The other UE 115-*c* may be another URLLC UE 115-*a* or may be a non-URLLC UE 115-*b*. Steps 305 and 310 may occur in any temporal order, and may in some cases occur simultaneously.

At step 315, base station 105-*a* may assign to URLLC UE 115-*a* a dedicated acknowledgement resource. In some cases, base station 105-*a* may assign the dedicated acknowledgement resource to URLLC UE 115-*a* in semi-persistent fashion—e.g., via an RRC connection protocol. In some cases, base station 105-*a* may assign the dedicated acknowledgement resource to URLLC UE 115-*a* in dynamic fashion—e.g., via a downlink control channel, such as a physical downlink control channel (PDCCH). When base station 105-*a* assigns the dedicated acknowledgement resource to URLLC UE 115-*a* in dynamic fashion, base station 105-*a* may change the assignment—e.g., may assign to URLLC UE 115-*a* different dedicated acknowledgement resource—at some later time, including on a per-time interval (e.g., per slot) basis.

At step 320, base station 105-*a* may schedule a downlink data transmission to the other UE 115-*c* via the same downlink transmission resource assigned at step 315 to URLLC UE 115-*a* as a dedicated acknowledgement resource. The dedicated acknowledgement resource may be included within a shared downlink data channel, such as a PDSCH. Steps 315 and 320 may occur in any temporal order, and may in some cases occur simultaneously. In some examples, the other UE 115-*c* may be a non-URLLC UE 115-*b*, and the data scheduled at step 320 may comprise data for eMBB communications.

At step 325, URLLC UE 115-*a* may transmit and base station 105-*a* may receive a grant-free uplink transmission. The grant free-uplink transmission at step 325 may be for low latency communications, ultra-reliable communications, or any combination thereof. After sending the grant-free uplink transmission, URLLC UE 115-*a* may monitor at step 330 the dedicated acknowledgement resource that was assigned to URLLC UE 115-*a* at step 315.

At step 335, base station 105-*a* may attempt to decode the grant-free uplink transmission transmitted at step 325.

At step 340, base station 105-*a* may puncture the data associated with the downlink data transmission scheduled at step 320. Step 340 may comprise replacing the data scheduled at step 320 with data for an acknowledgement of the grant-free transmission received by base station 105-*a* at step 325.

At step 345, base station 105-*a* may transmit, via the dedicated assignment resource assigned, an acknowledgement of the grant-free transmission transmitted by URLLC UE 115-*a* at step 325. Because the other UE 115-*c* was scheduled at step 320 to receive a downlink data transmission via the dedicated assignment resource, the other UE 115-*c* and the URLLC UE 115-*a* may both receive the acknowledgement transmitted at step 345. The acknowledgment may be an ACK and indicate that the decode attempt at step 335 was successful, or the acknowledgement may be a NACK and indicate that the decode attempt at step 335 was unsuccessful. In some cases, base station 105-*a* may include as part of the acknowledgement (or may send to URLLC UE 115-*a* as part of a separate transmission) a grant of uplink transmission resources that URLLC UE 115-*a* may use for one or more subsequent uplink transmissions. In some examples, base station 105-*a* may send the acknowledgement at step 345 one transmission time interval (e.g., one slot or mini slot) after the transmission time interval in which base station 105-*a* received the grant-free uplink transmission at step 325. In some examples, base station 105-*a* may not send to the URLLC UE 115-*a* any indication of the puncturing that occurs at step 340—such an indication may be necessary because the puncturing is responsive to the grant-free uplink transmission sent by the URLLC UE 115-*a* at step 325 and the punctured resource (the dedicated acknowledgement resource) has been preassigned to the URLLC UE 115-*a* at step 315.

At step 350, base station 105-*a* may transmit to the other UE 115-*c* an indication of the puncturing that occurred at step 340. For example, at step 350, base station 105-*a* may transmit to the other UE 115-*c* an indication that the data the other UE 115-*c* received at step 345 was not the data that was scheduled at step 320. In some examples, base station 105 may include in the indication sent at step 350 (or send as a separate transmission to the other UE 105-*c*) an instruction to the other UE 115-*c* to discard the data that the other UE 115-*c* received at step 345. And in some examples, base station 105 may include in the indication sent at step 350 (or send as a separate transmission to the other UE 105-*c*) information regarding one or more downlink transmission resources via which base station 105-*a* will transmit to the other UE 115-*c* the data that was scheduled at step 320. Step 350 may occur after step 345 in some examples (e.g., one or more transmission time intervals (e.g., slot or mini slot) after step 345), and may in other examples occur simultaneously (e.g., in the same transmission time interval (e.g., slot or mini slot) as step 345). For example, base station 105-*a* may in some examples transmit the indication of puncturing sent at step 350 and the acknowledgement sent at step 345 in the same transmission time interval (e.g., in the same slot or mini slot). Base station 105-*a* may transmit the indication at step 350 as part of a control channel (such as a PDCCH), via a dedicated indication channel (e.g., a channel specific to sending indications of puncturing, which may also be dedicated to UE 115-*c* or may be common with other UEs 115), or via a combination thereof.

After receiving the acknowledgement at step 345, URLLC UE 115-*a* may determine at step 355 whether the acknowledgement is an ACK or a NACK. If the acknowledgement is a NACK, URLLC UE 115-*a* may at step 360 retransmit to base station 105-*a* data that URLLC UE 115-*a* previously sent at step 325. If the acknowledgement is an ACK, URLLC UE 115-*a* may at step 360 transmit to base station 105-*a* additional uplink data (e.g., data other than what URLLC UE 115-*a* previously sent at step 325), depending on whether URLLC UE 115-*a* has additional data to send. If the acknowledgement received at step 345 comprised (or if base station 105-*a* otherwise sent to URLLC UE 115-*a*) a grant of uplink transmission resources, the transmission at step 360 may be via a granted resource; otherwise, the transmission at step 360 may be a grant-free transmission. In some cases, URLLC UE 115-*a* may send the transmission at step 360 one transmission time interval (e.g., one slot or mini slot) after the transmission time interval in which base station 105-*a* transmitted the acknowledgement at step 345.

Separately, after receiving the indication of puncturing at step 350, the other UE 115-*c* may discard data it received at step 345 (in response to an instruction from base station 105-*a* to discard or otherwise). The other UE 115-*c* may also at step 365 receive the data it was scheduled to receive at step 320. In some examples, the other UE 115-*c* may at step 365 receive the data it was scheduled to receive at step 320 via one or more transmission resources indicated by the indication of puncturing or indicated by the base station 105-*a* as part of a separate transmission to the other UE 115-*c*. Steps 365 and 350 may occur in any temporal order, and may in some cases occur simultaneously.

Although process flow 300 is illustrated in the context of a single URLLC UE 115-*a* and a single other UE 115-*c*, it is to be understood that the same techniques could be readily extended to examples in which other UE 115-*c* comprises multiple UEs 115.

The use of a dedicated acknowledgement resource wherein the dedicated acknowledgement resource comprises a shared downlink data resource that may be punctured in the event of a grant-free uplink transmission may improve efficiency with respect to transmission resources (e.g., time, frequency, code, spatial, or spectrum resources) by providing reliable acknowledgment of grant-free uplink transmissions without tying up transmission resources when not needed for acknowledgements thereof.

Figure 4:
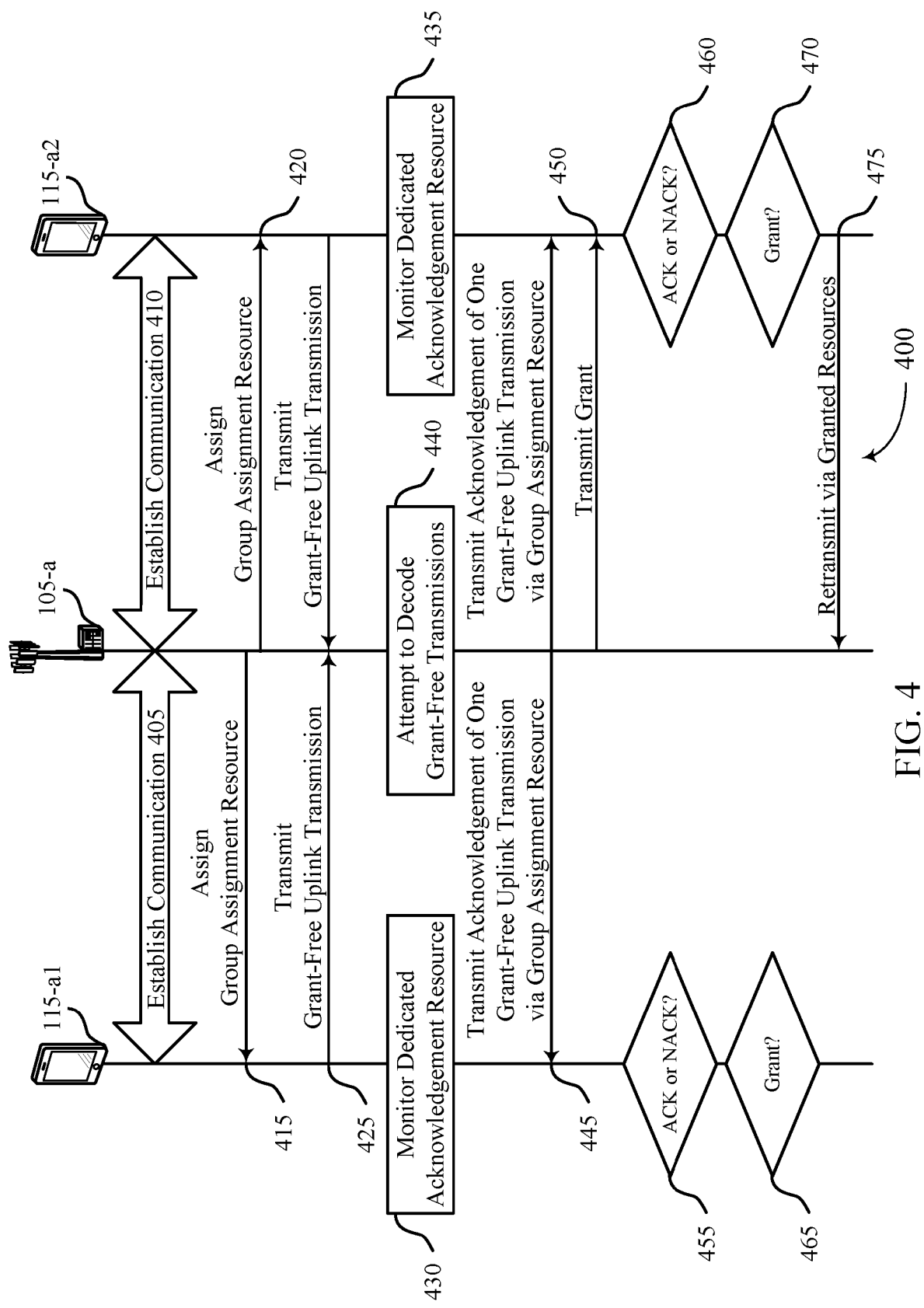
FIG. 4 illustrates an example of a process flow that supports acknowledgement mechanisms for uplink low latency communications in accordance with aspects of the present disclosure.

FIG. 4 illustrates an example of a process flow 400 in which base station 105-*a* assigns a group acknowledgement resource to multiple URLLC UEs 115-*a* in accordance with various aspects of the present disclosure. In some examples, process flow 400 may be implemented by aspects of wireless communications system 100 or wireless communications system 200.

At step 405, base station 105-*a* and a first URLLC UE 115-*a*1 may establish communication according to established connection establishment techniques for the wireless communications system.

At step 410, base station 105-*a* and a second URLLC UE 115-*a*2 may also establish communication according to established connection establishment techniques for the wireless communications system. Steps 405 and 410 may occur in any temporal order, and may in some cases occur simultaneously.

At step 415, base station 105-*a* may assign to the first URLLC UE 115-*a*1 a group acknowledgement resource. The group acknowledgement resource may be included within a shared downlink data channel, such as a PDSCH.

At step 420, base station 105-*a* may assign to the second URLLC UE 115-*a*2 the same group acknowledgement resource that base station 105-*a* assigned to the first URLLC UE 115-*a*1 at step 415. Steps 415 and 420 may occur in any temporal order, and may in some cases occur simultaneously.

In some cases, step 415 may comprise base station 105-*a* assigning to the first URLLC UE 115-*a*1 a dedicated acknowledgement resource, but upon the occurrence of step 420, in which that same acknowledgement resource is assigned to the second URLLC UE 115-*a*2, the dedicated acknowledgement resource may become a group acknowledgement resource. It is also to be understood that in some cases, the group acknowledgement resource assigned at steps 415 and 420 may also be assigned to one or more other URLLC UEs 115-*a*.

Also, in some cases, base station 105-*a* may assign the group acknowledgement resource at steps 415 and 420 in semi-persistent fashion—e.g., via an RRC connection protocol. In some cases, base station 105-*a* may assign the group acknowledgement resource at steps 415 and 420 in dynamic fashion—e.g., via a downlink control channel, such as a PDCCH. When base station 105-*a* assigns the dedicated acknowledgement resource in dynamic fashion, base station 105-*a* may change the assignment—e.g., may assign to one or both of the first URLLC UE 115-*a*1 or the second URLLC UE 115-*a*2 a different dedicated or group acknowledgement resource—at some later time, including on a per-time interval (e.g., per slot) basis. Steps 415 and 420 may occur in any temporal order, and may in some cases occur simultaneously.

At step 425, base station 105-a may receive in the same time interval (e.g., in the same slot or mini slot) a first grant-free uplink transmission from the first URLLC UE 115-a1 and a second grant-free uplink transmission from the second URLLC UE 115-a2. The two grant free-uplink transmissions received by base station 105-a at step 425 may be for low latency communications, ultra-reliable communications, or any combination thereof.

After sending the first grant-free uplink transmission, the first URLLC UE 115-a1 may at step 430 monitor the group acknowledgement resource that was assigned to the URLLC UE 115-a1 at step 415.

Likewise, after sending the second grant-free uplink transmission, the second URLLC UE 115-a2 may at step 435 monitor the same group acknowledgement resource.

At step 440, base station 105-a attempts to decode one or more the grant-free uplink transmissions received at step 425.

At step 445, base station 105-a may transmit, via the group acknowledgement resource assigned at steps 415 and 420, an acknowledgement regarding one of the grant-free uplink transmissions received at step 425. If base station 105-a attempted to decode only one of the grant-free uplink transmissions received at step 425, then that is the grant-free uplink transmission for which base station 105-a transmits the acknowledgement at step 445. If base station 105-a attempted to decode multiple of the grant-free uplink transmissions received at step 425, then the acknowledgement at step 445 may correspond to any one of the grant-free uplink transmissions received at step 425. In some examples, if base station 105-a attempted to decode multiple grant-free uplink transmissions received at step 425, then the acknowledgement at step 445 may correspond to one of the grant-free uplink transmissions received at step 425 for which the decode at step 440 was successful.

Any URLLC UE 115-a that shares the group assignment resource may be monitoring the group assignment resource and thus may receive the acknowledgment transmitted by base station 105-a at step 445. For example, in process flow 400, both the first URLLC UE 115-a1 and the second URLLC UE 115-a2 receive the acknowledgment transmitted by base station 105-a at step 445. In some examples, base station 105-a may send the acknowledgement at step 445 one transmission time interval (e.g., one slot or mini slot) after the transmission time interval in which base station 105-a received the simultaneous grant-free uplink transmissions at step 425.

The acknowledgment sent at step 445 may be an ACK and indicate that the decode attempt at step 440 for the corresponding grant-free uplink transmission was successful, or the acknowledgement may be a NACK and indicate that the decode attempt at step 440 for the corresponding grant-free uplink transmission was unsuccessful. In some cases, base station 105-a may send to URLLC UE 115-a as part of the acknowledgement (or as part of a separate transmission) a grant of uplink transmission resources that URLLC UE 115-a may use for one or more subsequent uplink transmissions.

In the example of process flow 400, the acknowledgement transmitted at step 445 is an ACK indicating a successful decode of the first grant-free uplink transmission received from the first URLLC UE 115-a1 at step 425.

At step 450, base station 105-a may transmit one or more grants of uplink transmission resources. Base station 105-a may transmit the grants of uplink transmission resources within a search space included in a control channel, such as a PDCCH. Base station 105-a may include in a grant transmitted at step 450 an indication of a particular URLLC UE 115-a (or a particular plurality of URLLC UEs 115-a) to which the associated uplink transmission resources are granted. For example, base station 105-a may scramble or otherwise associate a grant transmitted at step 450 with a radio network temporary identifier RNTI corresponding to the particular URLLC UE 115-a (or particular plurality of URLLC UEs 115-a) to which the associated uplink transmission resources are granted.

Step 450 may occur after step 445 in some examples (e.g., one or more transmission time intervals (e.g., slot or mini slot) after step 445), and may in other examples occur simultaneously (e.g., in the same transmission time interval (e.g., slot or mini slot) as step 445). For example, base station 105-a may in some examples transmit a grant of uplink transmission resources at step 450 and the acknowledgement sent at step 445 in the same transmission time interval (e.g., in the same slot or mini slot).

In some examples, where the acknowledgement at step 445 is an ACK, step 450 may comprise transmitting a grant of uplink transmission resources to any URLLC UE 115-a other than the URLLC UE 115-a that sent the grant-free transmission corresponding to the ACK from which a grant-free uplink transmission was received at step 425. In other examples, where the acknowledgement at step 445 is a NACK, step 450 may comprise transmitting a grant of uplink transmission resources to the URLLC UE 115-a that sent the grant-free transmission corresponding to the NACK. In the example of process flow 400, the acknowledgement transmitted at step 445 is an ACK and corresponds to the grant-free uplink transmission received from the first URLLC UE 115-a1, and thus base station 105-a transmits at step 450 a grant of uplink transmission resources to the second URLLC UE 115-a2.

Any URLLC UE 115-a that receives the acknowledgement sent at step 445 via the group acknowledgement resource may thereafter determine whether the acknowledgement is an ACK or a NACK. Thus, in the example of process flow 400, the first URLLC UE 115-a1 may determine at step 455 that the acknowledgement is an ACK or a NACK, and the second URLLC UE 115-a2 may determine at step 460 that the same acknowledgement is an ACK.

Likewise, any URLLC UE 115-a that receives the acknowledgement sent at step 445 via the group acknowledgement resource may thereafter determine whether it has received a grant of uplink transmission resources. For example, base station 105-a may configure any URLLC UE 115-a a group acknowledgement resource to (in response to sending a grant-free uplink transmission and/or receiving an acknowledgement via the group acknowledgment resource) monitor a corresponding resource, such as a search space in a control channel, to determine whether the URLLC UE 115-a has also received a grant of uplink transmission resources. Thus, in the example of process flow 400, the first URLLC UE 115-a1 may determine at step 465 whether it has received a grant of uplink transmission resources by monitoring a search space, and the second URLLCUE 115-a2 may determine at step 470 whether it has received a grant of uplink transmission resources by monitoring the same search space.

In some cases, a URLLC UE 115-a may determine whether it has received a grant of uplink transmission resources based on whether or not any grant included in the search space has an associated RNTI or other identifier associated with URLLC UE 115-a. In the example of process flow 400, the first URLLC UE 115-a1 has not received a grant of uplink transmission resources, and the second URLLC UE 115-a2 has received a grant of uplink transmission resources; thus, both the first URLLC UE 115-a1 and the second URLLC UE 115-a2 may monitor the same search space, both only the second URLLC UE 115-a2 may identify that it has received a grant of uplink transmission resources.

In some examples, if a URLLC UE 115-a receives an ACK at step 445 via the group acknowledgement resource and determines that it did not receive a corresponding grant of uplink transmission resources, the URLLC UE 115-a may determine that the grant-free uplink transmission the URLLC UE 115-a sent at step 425 was successfully decoded by base station 105-a. Thus, in the example of process flow 400, the first URLLC UE 115-a1—which received an acknowledgement at step 445, determined at step 455 that the acknowledgement was an ACK, and determined at step 465 that it did not receive a grant of uplink transmission resources—may determine that the first grant-free uplink transmission that the first URLLC UE 115-a1 sent at step 425 was successfully decoded by the base station 105-a.

In some examples, if a URLLC UE 115-a receives an ACK at step 445 via the group acknowledgement resource and determines that it did receive a corresponding grant of uplink transmission resources, the URLLC UE 115-a may determine that the grant-free uplink transmission the URLLC UE 115-a sent at step 425 was not successfully decoded by base station 105-a. Thus, in the example of process flow 400, the second URLLC UE 115-a2—which received an acknowledgement at step 445, determined at step 460 that the acknowledgement was an ACK, and determined at step 470 that it did receive a grant of uplink transmission resources—may determine that the second grant-free uplink transmission that the second URLLC UE 115-a1 sent at step 425 was not successfully decoded by the base station 105-a.

In some examples, if a URLLC UE 115-a determines that the grant-free uplink transmission the URLLC UE 115-a sent at step 425 was not successfully decoded by base station 105-a, the URLLC UE 115-a may retransmit data that it previously sent at step 425. If the URLLC UE 115-a has received a grant of uplink transmission resources (e.g., at step 450), the URLLC UE 115-a may retransmit via the granted resources; otherwise, the URLLC UE 115-a may retransmit via a repeated grant-free uplink transmission, possibly up to some maximum number of repetitions. Thus, in the example of process flow 400, the second URLLC UE 115-a2 may at step 475 retransmit via granted uplink transmission resources (e.g., via the resources granted at step 450) data it previously transmitted at step 425.

Although process flow 400 is illustrated in the context of a first URLLC UE 115-a1 and a second UE 115-a2, it is to be understood that the same techniques could be readily extended to examples in which any number of URLLC UEs 115-a are assigned the same group acknowledgement resource. For example, in the example of process flow 400, the second UE 115-a2 may be representative of multiple URLLC UEs 115-a other than the first URLLC UE 115-a1.

Figure 5:
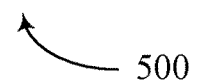
FIG. 5 illustrates an example of a decision matrix that supports acknowledgement mechanisms for uplink low latency communications in accordance with aspects of the present disclosure.

FIG. 5 shows a decision matrix 600 that supports acknowledgement mechanisms for uplink low latency communications in accordance with aspects of the present disclosure. FIG. 5 may illustrate the combination of options for a URLCC UE 115-a to which a group acknowledgement resource has been assigned in view of the possible outcomes of steps 455/460 and 465/470 in process flow 400.

In a first scenario, if the URLLC UE 115-a receives an ACK via the group acknowledgement resource but does not identify a corresponding grant of uplink transmission resources, the URLLC UE 115-a may determine that its prior grant-free uplink transmission was successfully decoded by base station 105-a and thus may not retransmit the data sent via its prior grant-free uplink transmission. The first scenario may arise, for example, if base station base station 105-a receives the prior grant-free uplink transmission sent by the URLLC UE 115-a, and successfully decodes the prior grant-free uplink transmission sent by the URLLC UE 115-a, regardless of whether it simultaneously received a grant-free uplink transmission from any other URLLC UE 115-a assigned the same group acknowledgement resource. The first scenario may correspond, for example, to the first URLLC UE 115-a1 in process flow 400.

In a second scenario, if the URLLC UE 115-a receives an ACK via the group acknowledgement resource and does identify a corresponding grant of uplink transmission resources, the URLLC UE 115-a may determine that its prior grant-free uplink transmission was not successfully decoded by base station 105-a and thus may retransmit the data sent via its prior grant-free uplink transmission, this time using the granted resources. The second scenario may arise, for example, if base station base station 105-a receives the prior grant-free uplink transmission sent by the URLLC UE 115-a, but also simultaneously receives a grant-free uplink transmission from one or more other URLLC UEs 115-a assigned the same group acknowledgement resource, and the ACK is intended for one of those other URLLC UEs 115-a. The first scenario may correspond, for example, to the second URLLC UE 115-a2 in process flow 400.

In a third scenario, if the URLLC UE 115-a receives a NACK via the group acknowledgement resource and does identify a corresponding grant of uplink transmission resources, the URLLC UE 115-a may determine that its prior grant-free uplink transmission was not successfully decoded by base station 105-a and thus may retransmit the data sent via its prior grant-free uplink transmission, this time using the granted resources. The third scenario may arise, for example, if base station 105-a receives the prior grant-free uplink transmission sent by the URLLC UE 115-a, does not simultaneously receive a grant-free uplink transmission from any other URLLC UE 115-a assigned the same group acknowledgement resource, but does not successfully decode the prior grant-free uplink transmission sent by the URLLC UE 115-a.

In a fourth scenario, if the URLLC UE 115-a receives a NACK via the group acknowledgement resource and does not identify a corresponding grant of uplink transmission resources, the URLLC UE 115-a may determine that its prior grant-free uplink transmission was not successfully decoded by base station 105-a and thus may retransmit the data sent via its prior grant-free uplink transmission. Because in this fourth scenario the URLLC UE 115-a has received no grant of uplink transmission resources, the URLLC UE 115-a may retransmit via one or more subsequent grant-free uplink transmissions, possibly until one or more termination events occur. Termination events may include for example, receipt of an acknowledgment indicating a successful decode by base station 105-a of the relevant data, a grant of uplink transmission resources, or reaching a maximum number of retransmissions. The fourth scenario may arise, for example, if base station 105-a did not receive the prior grant-free uplink transmission sent by the URLLC UE 115-a, but did receive a simultaneous grant-free uplink transmission from one other URLLC UE 115-a assigned the same group acknowledgement resource, and the NACK is intended for that other URLLC UE 115-a.

The use of both an acknowledgment and a grant to together indicate whether a base station successfully decoded a grant-free uplink transmission may enhance reliability, for example, by providing a double-check for a URLLC UE 115-a. The use of both an acknowledgment and a grant to together indicate whether a base station successfully decoded a grant-free uplink transmission may also improve efficiency with respect to transmission resources (e.g., time, frequency, code, spatial, or spectrum resources) by enabling a single acknowledgment resource to be shared by multiple URLLC UEs 115-a while maintaining sufficient reliability.

Further, techniques using dedicated acknowledgement resources and using group acknowledgement resources may be combined. For example, a base station 105-a may configure some URLLC UEs 115-a to use dedicated acknowledgment resources and other URLLC UEs 115-a to use group acknowledgement resources. As another example, base station 105-a may configure a URLLC UE 115-a to use a dedicated acknowledgment resource but later configure the same URLLC UE 115-a to use a group acknowledgment resource—e.g., in response to additional URLLC UEs 115-a entering the coverage area 110-a served by the base station 105-a.

Figure 6:
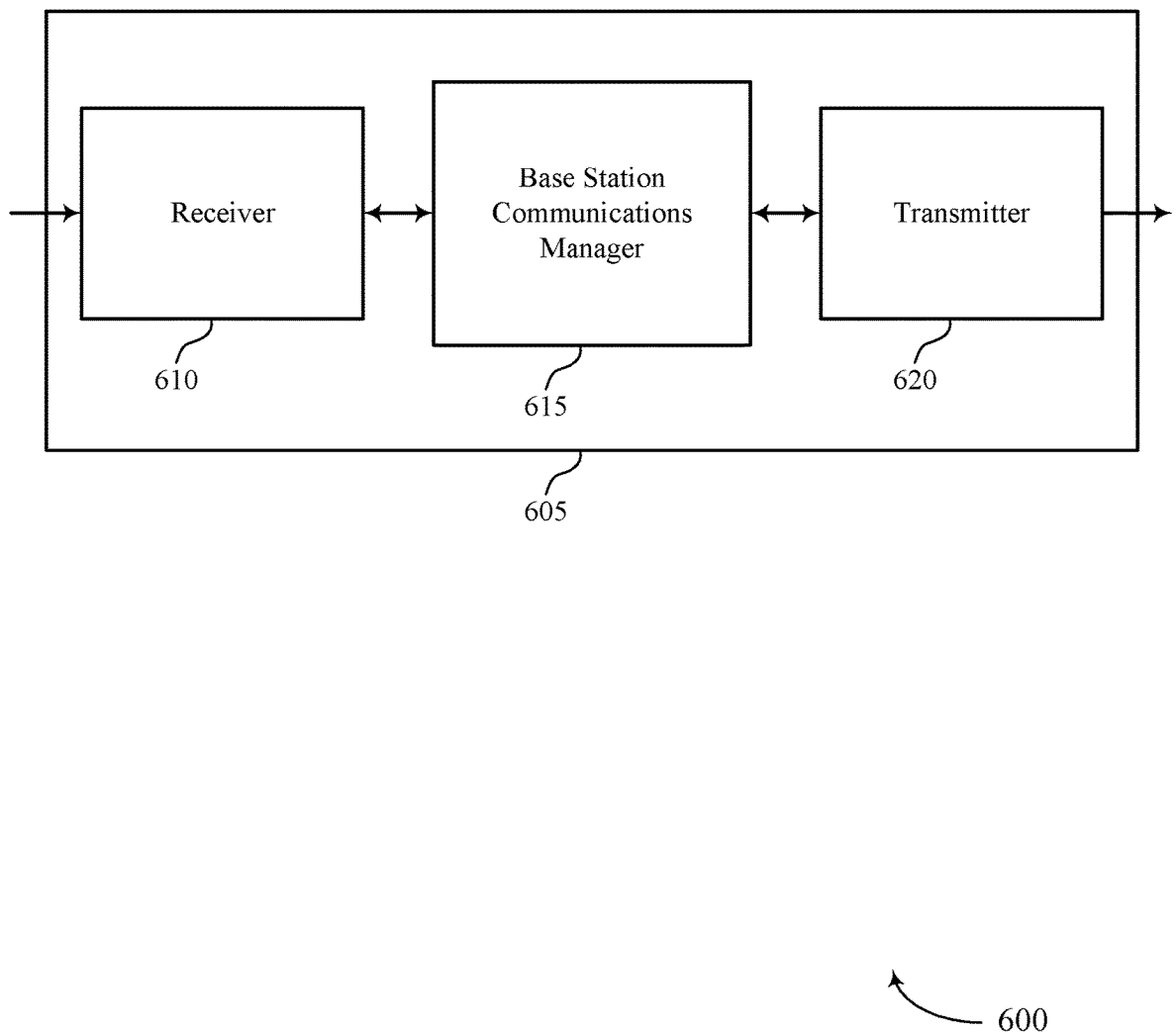
FIGS. 6 through 7 show block diagrams of a device that supports acknowledgement mechanisms for uplink low latency communications in accordance with aspects of the present disclosure.

FIG. 6 shows a block diagram 600 of a wireless device 605 that supports acknowledgement mechanisms for uplink low latency communications in accordance with aspects of the present disclosure. Wireless device 605 may be an example of aspects of a base station 105 as described herein. Wireless device 605 may include receiver 610, base station communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to acknowledgement mechanisms for uplink low latency communications, etc.). Information may be passed on to other components of the device. The receiver 610 may be an example of aspects of the transceiver 835 described with reference to FIG. 8. The receiver 610 may utilize a single antenna or a set of antennas.

Base station communications manager 615 may be an example of aspects of the base station communications manager 815 described with reference to FIG. 8.

Base station communications manager 615 and/or at least some of its various sub-components may be implemented in hardware, software executed by a processor, firmware, or any combination thereof. If implemented in software executed by a processor, the functions of the base station communications manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The base station communications manager 615 and/or at least some of its various sub-components may be physically located at various positions, including being distributed such that portions of functions are implemented at different physical locations by one or more physical devices. In some examples, base station communications manager 615 and/or at least some of its various sub-components may be a separate and distinct component in accordance with various aspects of the present disclosure. In other examples, base station communications manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

In some examples, base station communications manager 615 may assign an acknowledgement resource to a UE, the acknowledgment resource including a shared downlink data channel resource also assigned to one or more other UEs for a downlink data transmission, receive, from the UE, a grant-free uplink transmission, and transmit, to the UE via the acknowledgement resource, an acknowledgement of the grant-free uplink transmission, the acknowledgement puncturing the downlink data transmission.

In some examples, base station communications manager 615 may assign an acknowledgement resource to a UE group including a first UE and one or more additional UEs, the acknowledgment resource including a shared downlink data channel resource, receive a first grant-free uplink transmission from the first UE and at least one additional grant-free uplink transmission from the one or more additional UEs, transmit, via the acknowledgement resource, an acknowledgement of whether one of the first grant-free uplink transmission or the at least one additional grant-free uplink transmission is successfully decoded, and transmit a grant of uplink transmission resources for retransmission of data corresponding to any of the first grant-free uplink transmission or the at least one other grant-free uplink transmission that is unsuccessfully decoded.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may utilize a single antenna or a set of antennas.

Figure 7:
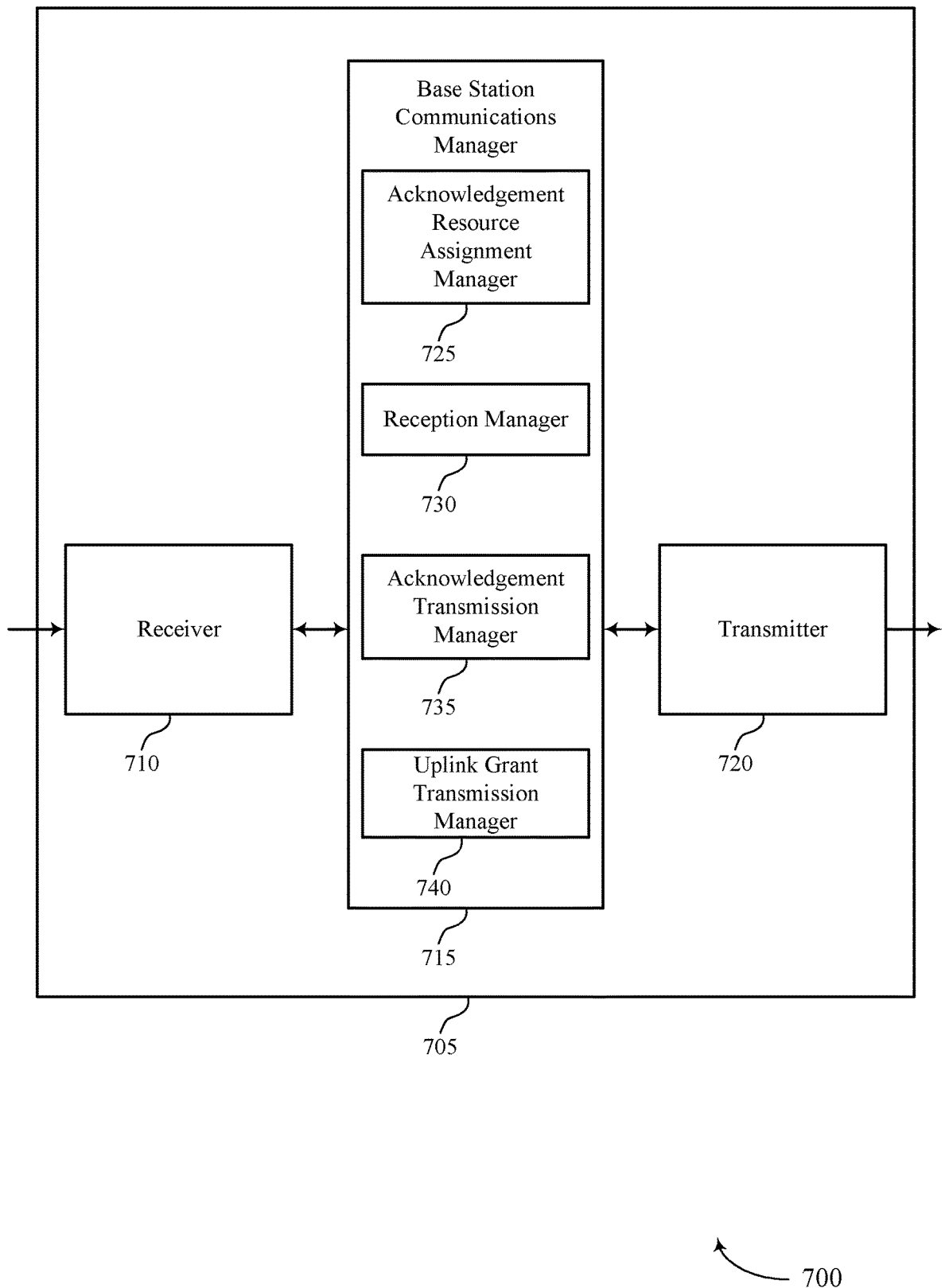

FIG. 7 shows a block diagram 700 of a wireless device 705 that supports acknowledgement mechanisms for uplink low latency communications in accordance with aspects of the present disclosure. Wireless device 705 may be an example of aspects of a wireless device 605 or a base station 105 as described with reference to FIG. 6. Wireless device 705 may include receiver 710, base station communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to acknowledgement mechanisms for uplink low latency communications, etc.). Information may be passed on to other components of the device. The receiver 710 may be an example of aspects of the transceiver 835 described with reference to FIG. 8. The receiver 710 may utilize a single antenna or a set of antennas.

Base station communications manager 715 may be an example of aspects of the base station communications manager 815 described with reference to FIG. 8.

Base station communications manager 715 may also include acknowledgement resource assignment manager 725, reception manager 730, acknowledgement transmission manager 735, and uplink grant transmission manager 740.

In some examples, acknowledgement resource assignment manager 725 may assign an acknowledgement resource to a UE, the acknowledgement resource including a shared downlink data channel resource also assigned to one or more other UEs for a downlink data transmission. In some cases, assigning, to the UE, the acknowledgement resource includes semi-persistently assigning the acknowledgement resource to the UE. In some cases, assigning, to the UE, the acknowledgement resource includes dynamically assigning the acknowledgement resource to the UE. In some cases, the downlink data transmission is for enhanced mobile broadband communications. In some cases, the shared downlink data channel resource includes a PDSCH.

In some examples, reception manager 730 may receive, from the UE, a grant-free uplink transmission and receive data from the UE via one or more transmission resources indicated by the acknowledgement. In some cases, the grant-free uplink transmission is for ultra-reliable communications, low latency communications, or a combination thereof. In some examples, reception manager 730 may receive at least one additional grant-free uplink transmission from one or more additional UEs apart from the UE.

In some examples, acknowledgement transmission manager 735 may transmit, to the UE via the acknowledgement resource, an acknowledgement of the grant-free uplink transmission, the acknowledgement puncturing the downlink data transmission, transmit to the one or more other UEs an indication of the puncturing, transmit the acknowledgement and transmitting the indication in a same transmission time interval, transmit the acknowledgement in a first transmission time interval and transmitting the indication in a second transmission time interval, the second transmission time interval subsequent to the first transmission time interval, and transmit the indication via a control channel, a dedicated indication channel, or a combination thereof. In some cases, transmitting the indication of the puncturing includes transmitting information regarding a subsequent transmission, the subsequent transmission including data punctured by the acknowledgement.

In some additional examples, instead of assigning a dedicated acknowledgement resource to each UE, acknowledgement resource assignment manager 725 may assign an acknowledgement resource to a UE group including a first UE and one or more additional UEs, the acknowledgment resource including a shared downlink data channel resource. In some cases, assigning the acknowledgement resource includes semi-persistently assigning the acknowledgement resource to the UE group. In some cases, the shared downlink data channel resource includes a PDSCH.

In the group acknowledgement resource scenario, reception manager 730 may receive a first grant-free uplink transmission from the first UE and at least one additional grant-free uplink transmission from the one or more additional UEs. In some cases, the first grant-free uplink transmission and the at least one additional grant-free uplink transmission are for ultra-reliable communications, low latency communications, or a combination thereof.

In the group acknowledgement resource scenario, acknowledgement transmission manager 735 may transmit, via the acknowledgement resource, an acknowledgement of whether one of the first grant-free uplink transmission or the at least one additional grant-free uplink transmission is successfully decoded.

In the group acknowledgement resource scenario, uplink grant transmission manager 740 may transmit a grant of uplink transmission resources for retransmission of data corresponding to any of the first grant-free uplink transmission or the at least one other grant-free uplink transmission that is unsuccessfully decoded and transmit the acknowledgement and transmitting the grant of uplink transmission resources using a single time transmission interval. In some cases, transmitting the grant of uplink transmission resources for retransmission of data includes transmitting the grant of uplink transmission resources within a search space in a control channel along with an indication of whether the grant of uplink transmission resources is for the first UE or for the one or more additional UEs. In some cases, the control channel includes a physical downlink control channel (PDCCH). In some examples, uplink grant transmission manager 740 may transmit a grant of uplink transmission resources for retransmission of data corresponding to the grant-free uplink transmission or the at least one other grant-free uplink transmission from the one or more additional UEs apart from the UE that is unsuccessfully decoded. In some examples, uplink grant transmission manager 740 may transmit the grant of uplink transmission resources within a search space in a control channel along with an indication of whether the grant of uplink transmission resources is for the UE or for the one or more additional UEs apart from the UE.

Transmitter 720 may transmit signals generated by other components of the device. In some examples, the transmitter 720 may be collocated with a receiver 710 in a transceiver module. For example, the transmitter 720 may be an example of aspects of the transceiver 835 described with reference to FIG. 8. The transmitter 720 may utilize a single antenna or a set of antennas.

Figure 8:
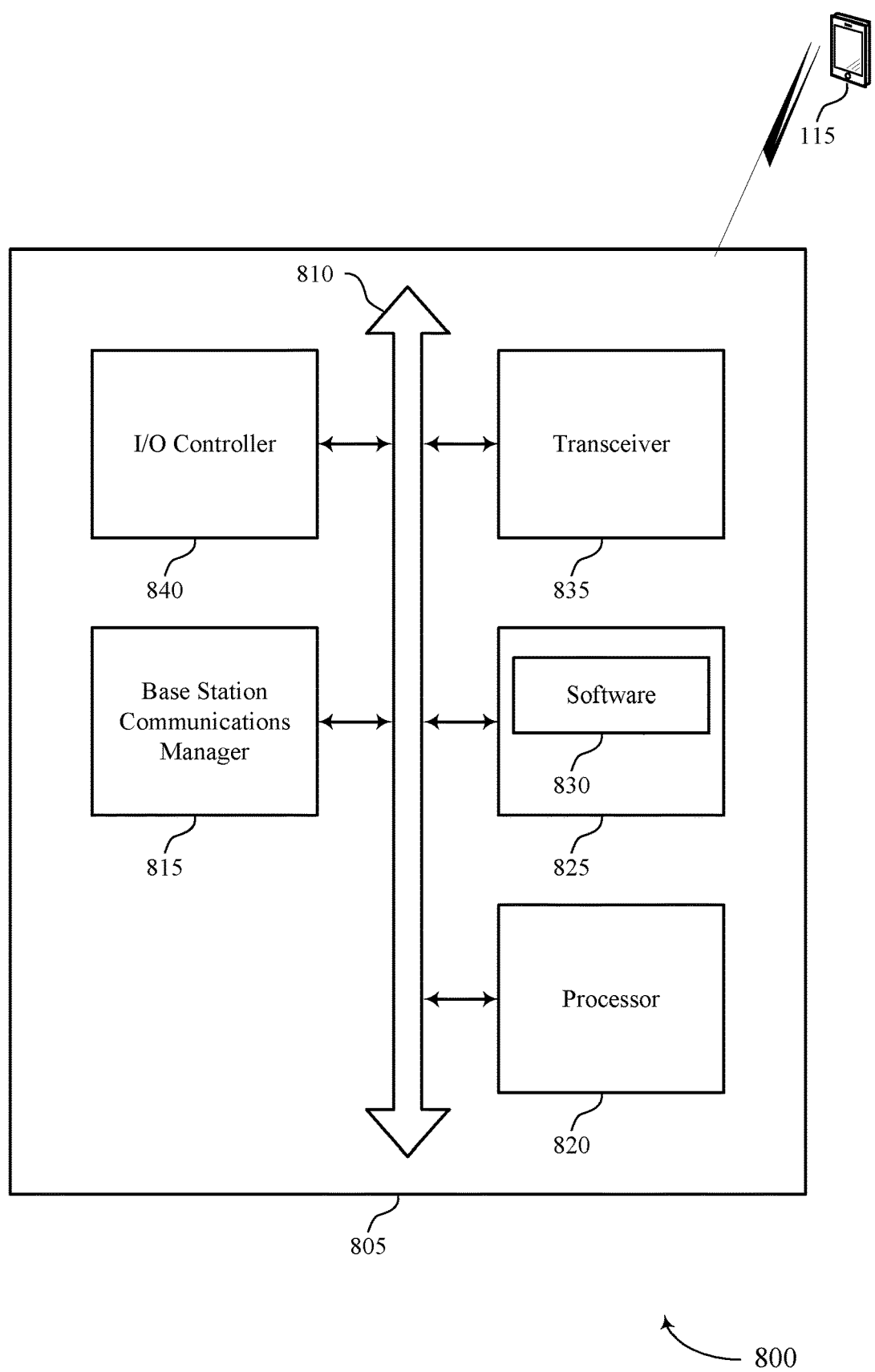
FIG. 8 illustrates a block diagram of a system including a base station that supports acknowledgement mechanisms for uplink low latency communications in accordance with aspects of the present disclosure.

FIG. 8 shows a diagram of a system 800 including a device 805 that supports acknowledgement mechanisms for uplink low latency communications in accordance with aspects of the present disclosure. Device 805 may be an example of or include the components of wireless device 605, wireless device 705, or a base station 105 as described above, e.g., with reference to FIGS. 6 and 7. Device 805 may include components for bi-directional voice and data communications including components for transmitting and receiving communications, including base station communications manager 815, processor 820, memory 825, software 830, transceiver 835, and I/O controller 840. These components may be in electronic communication via one or more buses (e.g., bus 810).

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting acknowledgement mechanisms for uplink low latency communications).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware or software operation such as the interaction with peripheral components or devices.

Software 830 may include code to implement aspects of the present disclosure, including code to support acknowledgement mechanisms for uplink low latency communications. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

I/O controller 840 may manage input and output signals for device 805. I/O controller 840 may also manage peripherals not integrated into device 805. In some cases, I/O controller 840 may represent a physical connection or port to an external peripheral. In some cases, I/O controller 840 may utilize an operating system such as iOS®, ANDROID®, MS-DOS®, MS-WINDOWS®, OS/2®, UNIX®, LINUX®, or another known operating system. In other cases, I/O controller 840 may represent or interact with a modem, a keyboard, a mouse, a touchscreen, or a similar device. In some cases, I/O controller 840 may be implemented as part of a processor. In some cases, a user may interact with device 805 via I/O controller 840 or via hardware components controlled by I/O controller 840.

Figure 9:
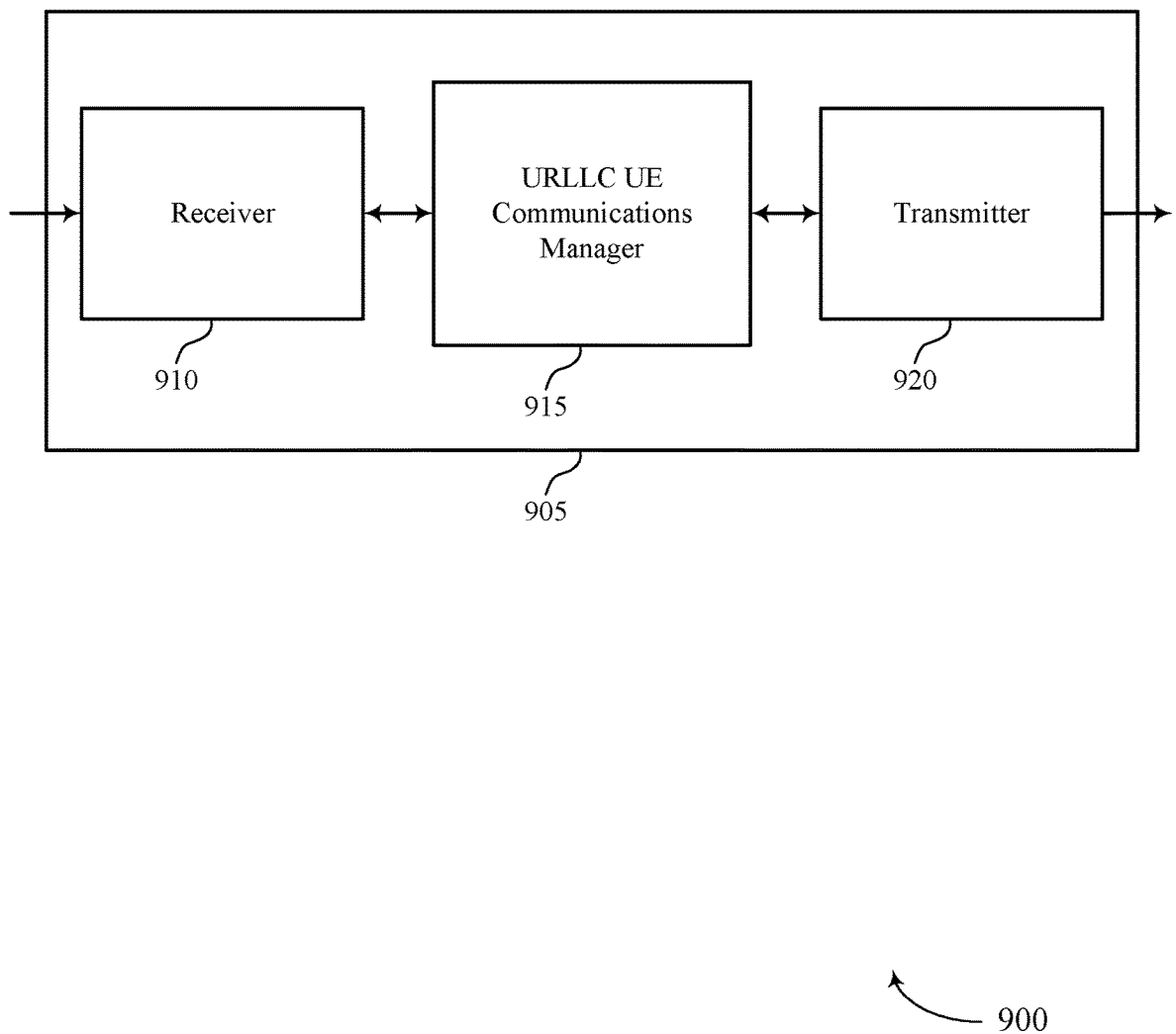
FIGS. 9 through 10 show block diagrams of a device that supports acknowledgement mechanisms for uplink low latency communications in accordance with aspects of the present disclosure.

FIG. 9 shows a block diagram 900 of a wireless device 905 that supports acknowledgement mechanisms for uplink low latency communications in accordance with aspects of the present disclosure. Wireless device 905 may be an example of aspects of a URLLC UE 115-*a* as described herein. Wireless device 905 may include receiver 910, URLLC UE communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to acknowledgement mechanisms for uplink low latency communications, etc.). Information may be passed on to other components of the device. The receiver 910 may be an example of aspects of the transceiver 1135 described with reference to FIG. 11. The receiver 910 may utilize a single antenna or a set of antennas.

URLLC UE communications manager 915 may be an example of aspects of the URLLC UE communications manager 1115 described with reference to FIG. 11.

URLLC UE communications manager 915 and/or at least some of its various sub-components may be implemented in hardware, software executed by a processor, firmware, or any combination thereof. If implemented in software executed by a processor, the functions of the URLLC UE communications manager 915 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The URLLC UE communications manager 915 and/or at least some of its various sub-components may be physically located at various positions, including being distributed such that portions of functions are implemented at different physical locations by one or more physical devices. In some examples, URLLC UE communications manager 915 and/or at least some of its various sub-components may be a separate and distinct component in accordance with various aspects of the present disclosure. In other examples, URLLC UE communications manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

URLLC UE communications manager 915 may receive an assignment of an acknowledgement resource, the acknowledgment resource including a shared downlink data channel resource available for a downlink data transmission to one or more other user equipments (UEs), transmit a grant-free uplink transmission, and monitor the acknowledgement resource for an acknowledgement of the grant-free uplink transmission.

Alternatively or in addition, URLLC UE communications manager 915 may receive an assignment of an acknowledgement resource, the acknowledgment resource including a shared downlink data channel resource also assigned to one or more other UEs, transmit a grant-free uplink transmission, receive an acknowledgement on the acknowledgement resource, monitor a search space in a control channel for a grant of uplink transmission resources for retransmission of data corresponding to the grant-free uplink transmission, and determine, based on the monitoring, whether the acknowledgement indicates a successful decode of the grant-free uplink transmission or an unsuccessful decode of the grant-free uplink transmission.

Transmitter 920 may transmit signals generated by other components of the device. In some examples, the transmitter 920 may be collocated with a receiver 910 in a transceiver module. For example, the transmitter 920 may be an example of aspects of the transceiver 1135 described with reference to FIG. 11. The transmitter 920 may utilize a single antenna or a set of antennas.

Figure 10:
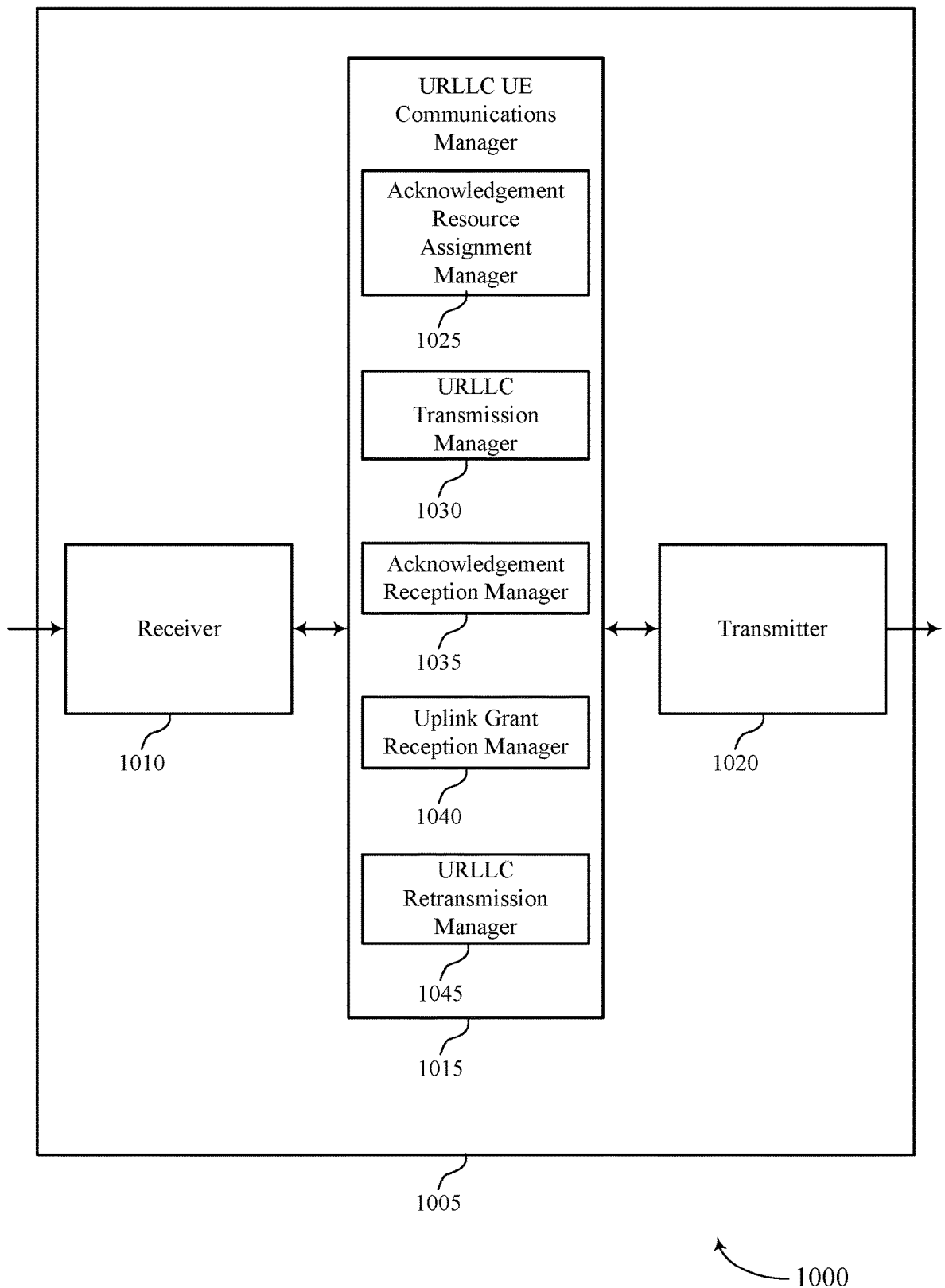

FIG. 10 shows a block diagram 1000 of a wireless device 1005 that supports acknowledgement mechanisms for uplink low latency communications in accordance with aspects of the present disclosure. Wireless device 1005 may be an example of aspects of a wireless device 905 or a URLLC UE 115-*a* as described with reference to FIG. 9. Wireless device 1005 may include receiver 1010, URLLC UE communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to acknowledgement mechanisms for uplink low latency communications, etc.). Information may be passed on to other components of the device. The receiver 1010 may be an example of aspects of the transceiver 1135 described with reference to FIG. 11. The receiver 1010 may utilize a single antenna or a set of antennas.

URLLC UE communications manager 1015 may be an example of aspects of the URLLC UE communications manager 1115 described with reference to FIG. 11.

URLLC UE communications manager 1015 may also include acknowledgement resource assignment manager 1025, URLLC transmission manager 1030, acknowledgement reception manager 1035, uplink grant reception manager 1040, and URLLC retransmission manager 1045.

In some examples, acknowledgement resource assignment manager 1025 may receive an assignment of an acknowledgement resource, the acknowledgment resource including a shared downlink data channel resource also assigned to one or more other UEs for downlink data transmission. In some cases, receiving the assignment of the acknowledgement resource includes receiving a semi-persistent assignment of the acknowledgement resource. In some cases, receiving the assignment of the acknowledgement resource includes receiving a dynamic assignment of the acknowledgement resource. In some cases, the shared downlink data channel resource includes a PDSCH.

In some examples, URLLC transmission manager 1030 may transmit a grant-free uplink transmission, retransmit data corresponding to the grant-free uplink transmission, and transmit data using one or more transmission resources indicated by the acknowledgement. In some cases, retransmitting data corresponding to the grant-free uplink transmission includes retransmitting data corresponding to the grant-free uplink transmission using one or more transmission resources indicated by the acknowledgement.

In some examples, acknowledgement reception manager 1035 may monitor the acknowledgement resource for an acknowledgement of the grant-free uplink transmission, receive the acknowledgment, where the acknowledgement includes a negative acknowledgement indicating that the grant-free uplink transmission was not successfully received, and receive the acknowledgment, where the acknowledgement includes an affirmative acknowledgement that the grant-free uplink transmission was successfully received.

In addition or alternatively, in some examples, acknowledgement resource assignment manager 1025 may receive an assignment of an acknowledgement resource, the acknowledgment resource including a shared downlink data channel resource also assigned to one or more other UEs (as opposed to being assigned on a per-UE basis). In some cases, receiving the assignment of the acknowledgement resource includes receiving a semi-persistent assignment of the acknowledgement resource. In some cases, the shared downlink data channel resource includes a PDSCH.

In the group acknowledgement resource scenario, URLLC transmission manager 1030 may transmit a grant-free uplink transmission.

In the group acknowledgement resource scenario, acknowledgement reception manager 1035 may receive an acknowledgement on the acknowledgement resource.

In the group acknowledgement resource scenario, uplink grant reception manager 1040 may monitor a search space in a control channel for a grant of uplink transmission resources for retransmission of data corresponding to the grant-free uplink transmission, evaluate a UE identifier associated with the potential grant, and receive the acknowledgement and receiving the grant within a single time transmission interval. In some cases, monitoring the search space in the control channel for the grant of uplink transmission resources includes identifying within the search space a potential grant of uplink transmission resources for retransmission of data corresponding to the grant-free uplink transmission. In some cases, the control channel includes a PDCCH.

In the group acknowledgement resource scenario, URLLC retransmission manager 1045 may determine, based on the monitoring, whether the acknowledgement indicates a successful decode of the grant-free uplink transmission or an unsuccessful decode of the grant-free uplink transmission. URLLC retransmission manager 1045 may determine that the acknowledgement indicates an unsuccessful decode of the grant-free uplink transmission based on determining that the search space includes a grant of uplink transmission resources for retransmission of data corresponding to the grant-free uplink transmission, and if so, URLLC retransmission manager 1045 may retransmit data corresponding to the grant-free uplink transmission using uplink transmission resources granted by the grant of uplink transmission resources. Or URLLC retransmission manager 1045 may determine that the acknowledgement indicates a successful decode of the grant-free uplink transmission based on determining that the search space lacks a grant of uplink transmission resources for retransmission of data corresponding to the grant-free uplink transmission. URLLC retransmission manager 1045 may also retransmit data corresponding to the grant-free uplink transmission via subsequent grant-free uplink transmissions prior to a termination event, where the termination event includes a threshold number of subsequent grant-free uplink transmissions, receipt of the acknowledgement, or a combination thereof.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1135 described with reference to FIG. 11. The transmitter 1020 may utilize a single antenna or a set of antennas.

Figure 11:
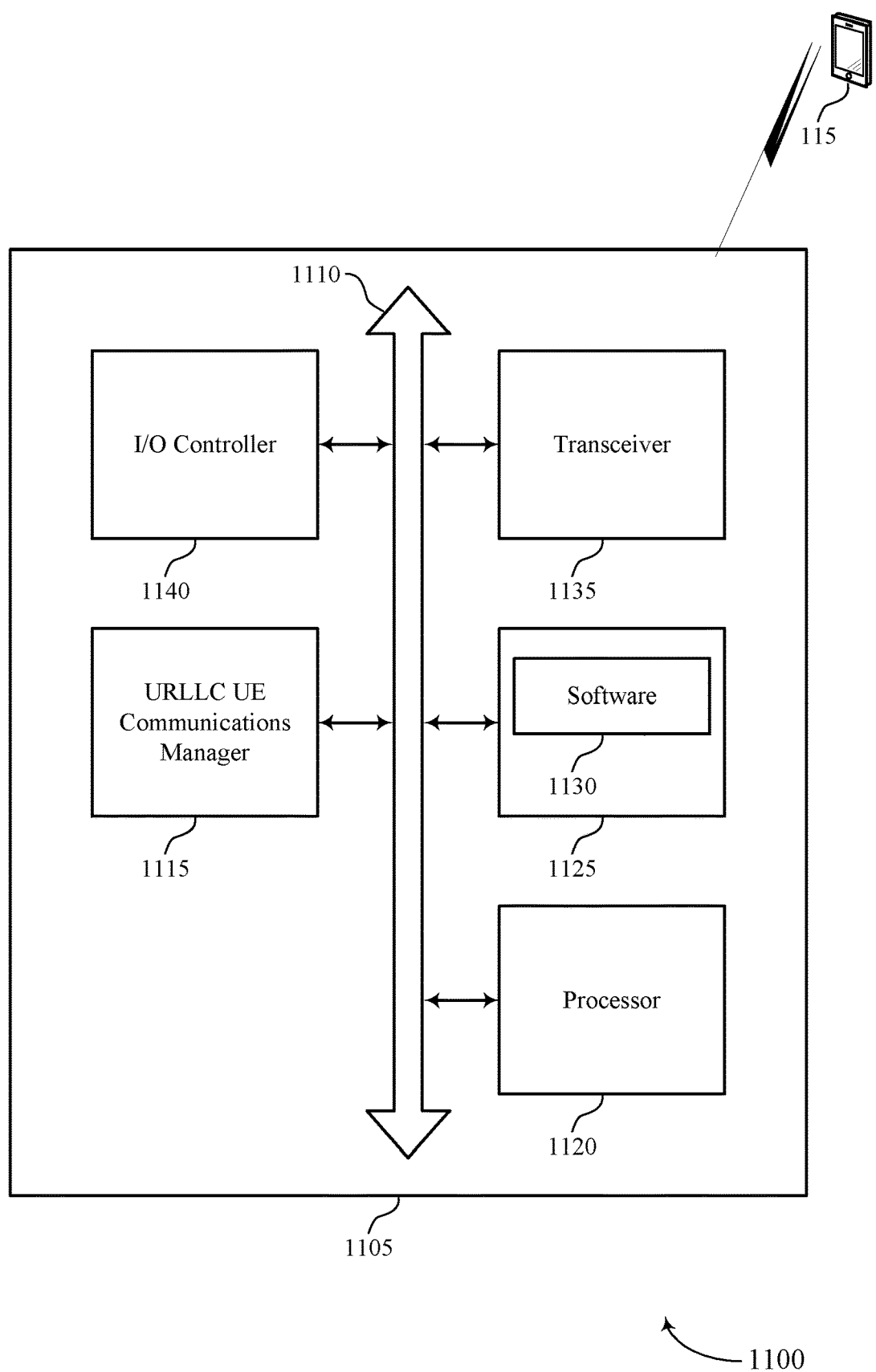
FIG. 11 illustrates a block diagram of a system including a ultra-reliable and low latency communications (URLLC) user equipment (UE) that supports acknowledgement mechanisms for uplink low latency communications in accordance with aspects of the present disclosure.

FIG. 11 shows a diagram of a system 1100 including a device 1105 that supports acknowledgement mechanisms for uplink low latency communications in accordance with aspects of the present disclosure. Device 1105 may be an example of or include the components of URLLC UE 115-*a* as described above, e.g., with reference to FIG. 1. Device 1105 may include components for bi-directional voice and data communications including components for transmitting and receiving communications, including URLLC UE communications manager 1115, processor 1120, memory 1125, software 1130, transceiver 1135, and I/O controller 1140. These components may be in electronic communication via one or more buses (e.g., bus 1110).

Processor 1120 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting acknowledgement mechanisms for uplink low latency communications).

Memory 1125 may include RAM and ROM. The memory 1125 may store computer-readable, computer-executable software 1130 including instructions that, when executed, cause the processor to perform various functions described herein. In some cases, the memory 1125 may contain, among other things, a BIOS which may control basic hardware or software operation such as the interaction with peripheral components or devices.

Software 1130 may include code to implement aspects of the present disclosure, including code to support acknowledgement mechanisms for uplink low latency communications. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas.

I/O controller 1140 may manage input and output signals for device 1105. I/O controller 1140 may also manage peripherals not integrated into device 1105. In some cases, I/O controller 1140 may represent a physical connection or port to an external peripheral. In some cases, I/O controller 1140 may utilize an operating system such as iOS®, ANDROID®, MS-DOS®, MS-WINDOWS®, OS/2®, UNIX®, LINUX®, or another known operating system. In other cases, I/O controller 1140 may represent or interact with a modem, a keyboard, a mouse, a touchscreen, or a similar device. In some cases, I/O controller 1140 may be implemented as part of a processor. In some cases, a user may interact with device 1105 via I/O controller 1140 or via hardware components controlled by I/O controller 1140.

Figure 12:
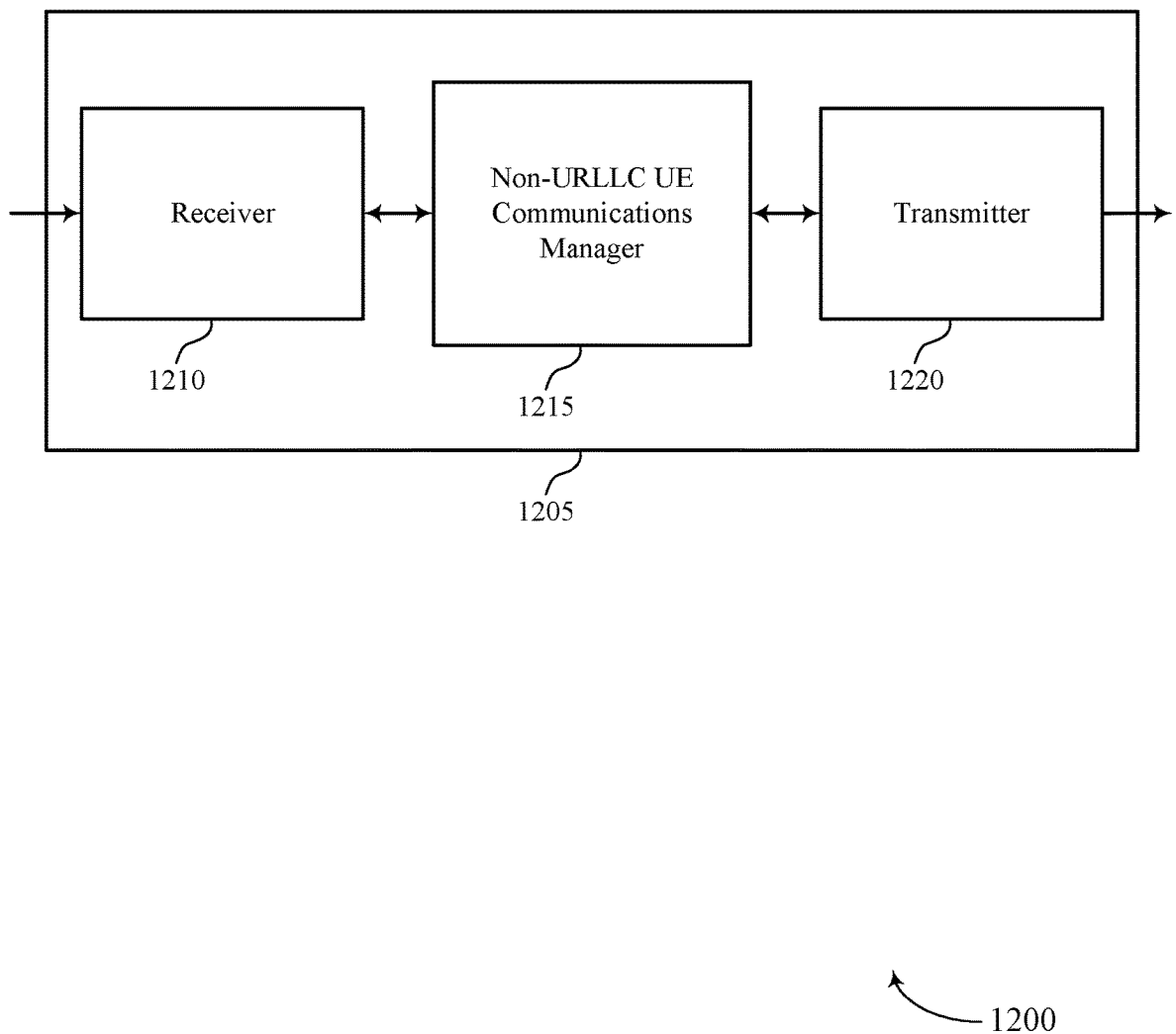
FIGS. 12 through 13 show block diagrams of a device that supports acknowledgement mechanisms for uplink low latency communications in accordance with aspects of the present disclosure.

FIG. 12 shows a block diagram 1200 of a wireless device 1205 that supports acknowledgement mechanisms for uplink low latency communications in accordance with aspects of the present disclosure. Wireless device 1205 may be an example of aspects of a non-URLLC UE 115-*b* as described herein. Wireless device 1205 may include receiver 1210, non-URLLC UE communications manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to acknowledgement mechanisms for uplink low latency communications, etc.). Information may be passed on to other components of the device. The receiver 1210 may be an example of aspects of the transceiver 1435 described with reference to FIG. 14. The receiver 1210 may utilize a single antenna or a set of antennas.

Non-URLLC UE communications manager 1215 may be an example of aspects of the non-URLLC UE communications manager 1415 described with reference to FIG. 14.

Non-URLLC UE communications manager 1215 and/or at least some of its various sub-components may be implemented in hardware, software executed by a processor, firmware, or any combination thereof. If implemented in software executed by a processor, the functions of the non-URLLC UE communications manager 1215 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The non-URLLC UE communications manager 1215 and/or at least some of its various sub-components may be physically located at various positions, including being distributed such that portions of functions are implemented at different physical locations by one or more physical devices. In some examples, non-URLLC UE communications manager 1215 and/or at least some of its various sub-components may be a separate and distinct component in accordance with various aspects of the present disclosure. In other examples, non-URLLC UE communications manager 1215 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Non-URLLC UE communications manager 1215 may receive an assignment for a shared downlink data channel resource, the shared downlink data channel resource also assigned to at least one other UE as an acknowledgment resource, receive a data transmission on the shared downlink data channel resource, receive an indication that data intended for the UE was punctured by the received data transmission, and receive a subsequent transmission including punctured data from the data transmission.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1435 described with reference to FIG. 14. The transmitter 1220 may utilize a single antenna or a set of antennas.

Figure 13:
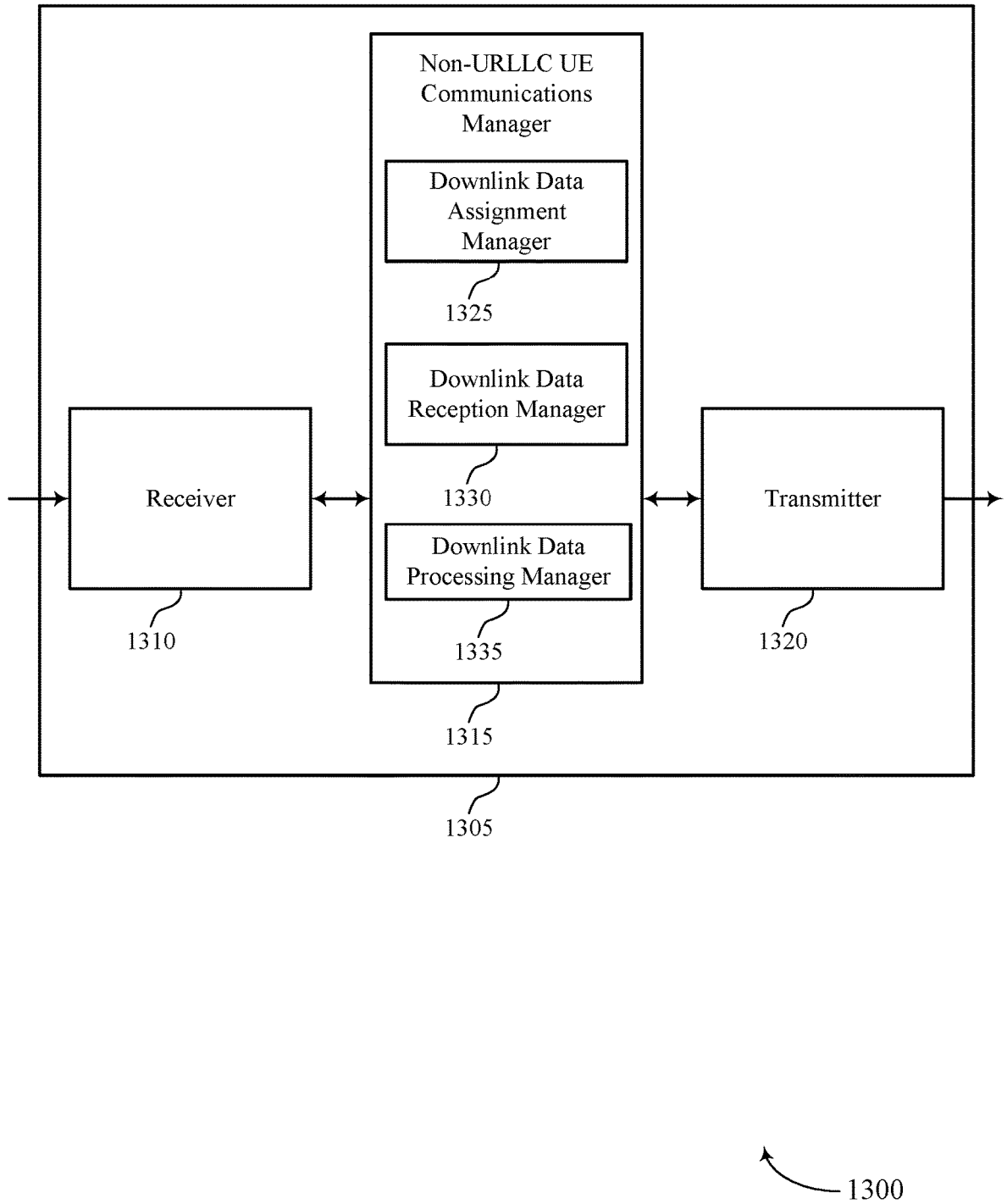

FIG. 13 shows a block diagram 1300 of a wireless device 1305 that supports acknowledgement mechanisms for uplink low latency communications in accordance with aspects of the present disclosure. Wireless device 1305 may be an example of aspects of a wireless device 1205 or a non-URLLC UE 115-*b* as described with reference to FIG. 12. Wireless device 1305 may include receiver 1310, non-URLLC UE communications manager 1315, and transmitter 1320. Wireless device 1305 may also include a processor. Each of these components may be in communication with one another (e.g., via one or more buses).

Receiver 1310 may receive information such as packets, user data, or control information associated with various information channels (e.g., control channels, data channels, and information related to acknowledgement mechanisms for uplink low latency communications, etc.). Information may be passed on to other components of the device. The receiver 1310 may be an example of aspects of the transceiver 1435 described with reference to FIG. 14. The receiver 1310 may utilize a single antenna or a set of antennas.

Non-URLLC UE communications manager 1315 may be an example of aspects of the non-URLLC UE communications manager 1415 described with reference to FIG. 14.

Non-URLLC UE communications manager 1315 may also include downlink data assignment manager 1325 and downlink data reception manager 1330.

Downlink data assignment manager 1325 may receive an assignment for a shared downlink data channel resource, the shared downlink data channel resource also assigned to at least one other UE as an acknowledgment resource. In some cases, the shared downlink data channel resource includes a PDSCH.

Downlink data reception manager 1330 may receive a data transmission on the shared downlink data channel resource, receive an indication that data intended for the UE was punctured by the received data transmission, receive a subsequent transmission including punctured data from the data transmission, and receive the indication via a control channel, a dedicated indication channel, or a combination thereof. In some cases, receiving the indication includes receiving information regarding one or more transmission resources to be used for the subsequent transmission.

Downlink data processing manager 1335 may discard the data transmission in the event that downlink data reception manager 1330 receives an indication that data intended for the UE was punctured by the received data transmission.

Transmitter 1320 may transmit signals generated by other components of the device. In some examples, the transmitter 1320 may be collocated with a receiver 1310 in a transceiver module. For example, the transmitter 1320 may be an example of aspects of the transceiver 1435 described with reference to FIG. 14. The transmitter 1320 may utilize a single antenna or a set of antennas.

Figure 14:
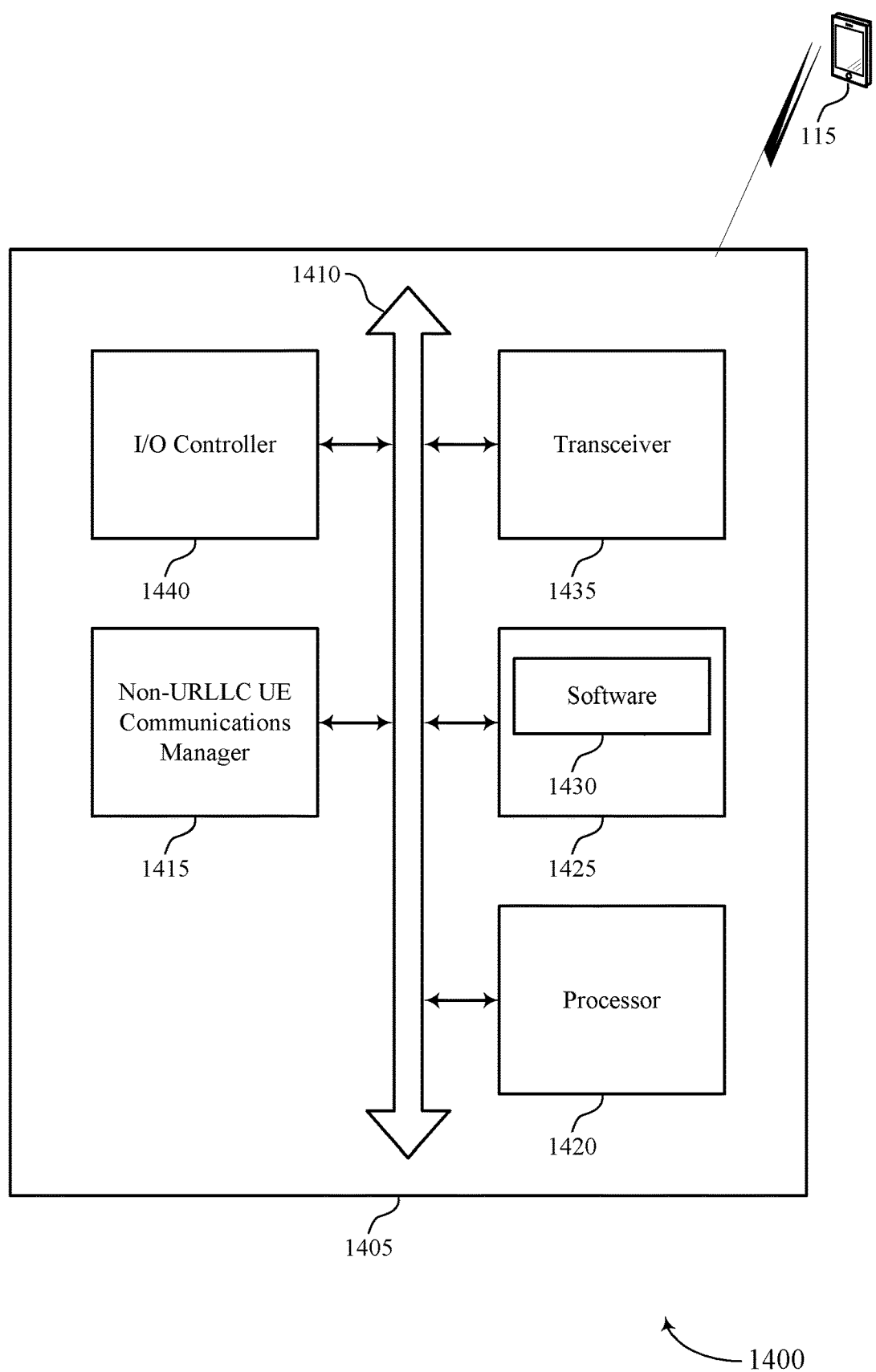
FIG. 14 illustrates a block diagram of a system including a non-URLLC UE that supports acknowledgement mechanisms for uplink low latency communications in accordance with aspects of the present disclosure.

FIG. 14 shows a diagram of a system 1400 including a device 1405 that supports acknowledgement mechanisms for uplink low latency communications in accordance with aspects of the present disclosure. Device 1405 may be an example of or include the components of non-URLLC UE 115-*b* as described above, e.g., with reference to FIG. 1. Device 1405 may include components for bi-directional voice and data communications including components for transmitting and receiving communications, including non-URLLC UE communications manager 1415, processor 1420, memory 1425, software 1430, transceiver 1435, and I/O controller 1440. These components may be in electronic communication via one or more buses (e.g., bus 1410).

Processor 1420 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting acknowledgement mechanisms for uplink low latency communications).

Memory 1425 may include RAM and ROM. The memory 1425 may store computer-readable, computer-executable software 1430 including instructions that, when executed, cause the processor to perform various functions described herein. In some cases, the memory 1425 may contain, among other things, a BIOS which may control basic hardware or software operation such as the interaction with peripheral components or devices.

Software 1430 may include code to implement aspects of the present disclosure, including code to support acknowledgement mechanisms for uplink low latency communications. Software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described above. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas.

I/O controller 1440 may manage input and output signals for device 1405. I/O controller 1440 may also manage peripherals not integrated into device 1405. In some cases, I/O controller 1440 may represent a physical connection or port to an external peripheral. In some cases, I/O controller 1440 may utilize an operating system such as iOS®, ANDROID®, MS-DOS®, MS-WINDOWS®, OS/2®, UNIX®, LINUX®, or another known operating system. In other cases, I/O controller 1440 may represent or interact with a modem, a keyboard, a mouse, a touchscreen, or a similar device. In some cases, I/O controller 1440 may be implemented as part of a processor. In some cases, a user may interact with device 1405 via I/O controller 1440 or via hardware components controlled by I/O controller 1440.

Figure 15:
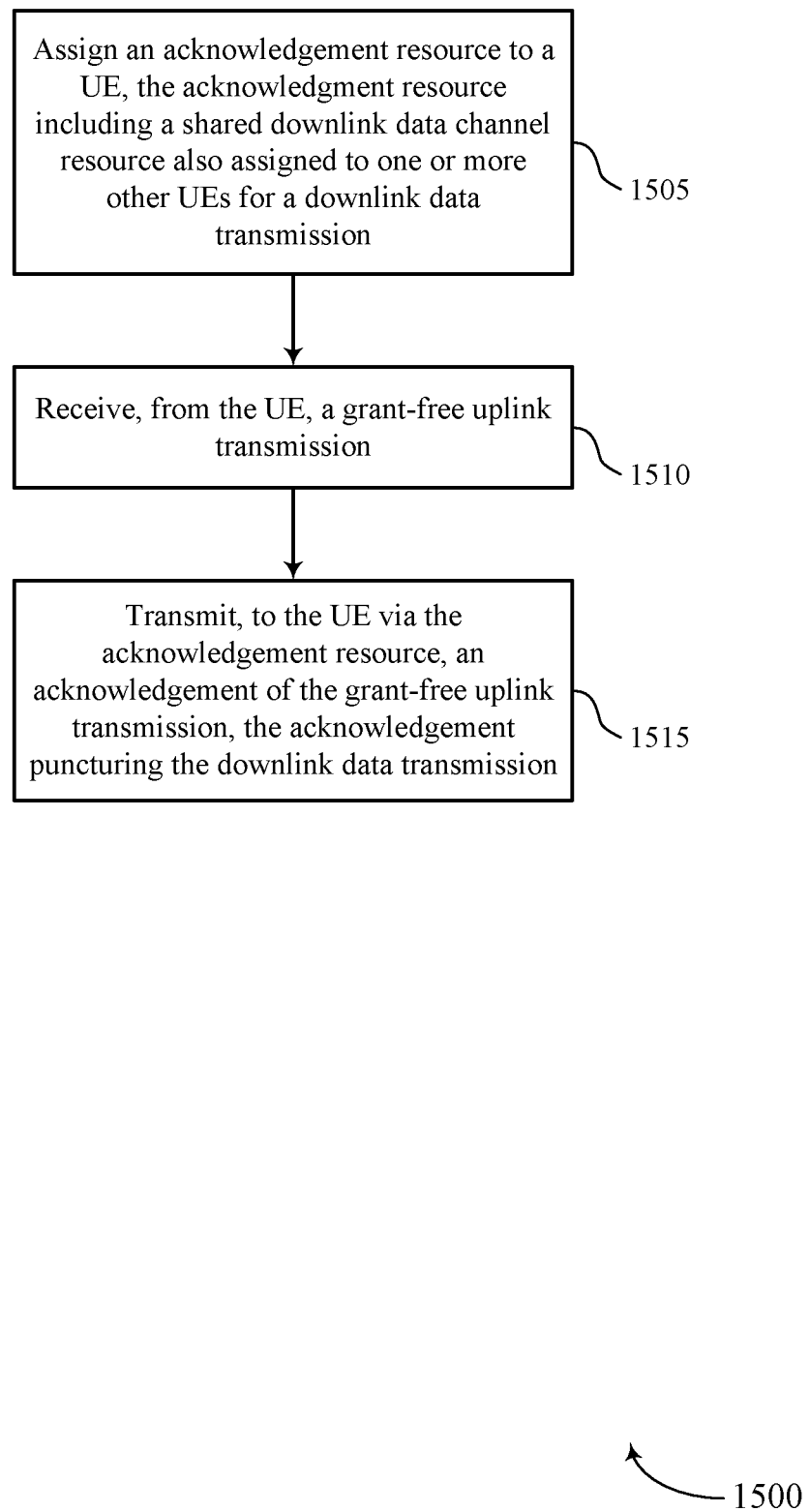
FIGS. 15 through 19 illustrate methods for acknowledgement mechanisms for uplink low latency communications in accordance with aspects of the present disclosure.

FIG. 15 shows a flowchart illustrating a method 1500 for acknowledgement mechanisms for uplink low latency communications in accordance with aspects of the present disclosure. The operations of method 1500 may be implemented by a base station 105 or its components as described herein. For example, the operations of method 1500 may be performed by a base station communications manager as described with reference to FIGS. 6 through 8. In some examples, a base station 105 may execute a set of codes to control the functional elements of the device to perform the functions described below. Additionally or alternatively, the base station 105 may perform aspects of the functions described below using special-purpose hardware.

At block 1505 the base station 105 may assign an acknowledgement resource to a UE, the acknowledgment resource comprising a shared downlink data channel resource also assigned to one or more other UEs for a downlink data transmission. The operations of block 1505 may be performed according to the methods described herein. In certain examples, aspects of the operations of block 1505 may be performed by an acknowledgement resource assignment manager as described with reference to FIGS. 6 through 8.

At block 1510 the base station 105 may receive, from the UE, a grant-free uplink transmission. The operations of block 1510 may be performed according to the methods described herein. In certain examples, aspects of the operations of block 1510 may be performed by a reception manager as described with reference to FIGS. 6 through 8.

At block 1515 the base station 105 may transmit, to the UE via the acknowledgement resource, an acknowledgement of the grant-free uplink transmission, the acknowledgement puncturing the downlink data transmission. The operations of block 1515 may be performed according to the methods described herein. In certain examples, aspects of the operations of block 1515 may be performed by an acknowledgement transmission manager as described with reference to FIGS. 6 through 8.

Figure 16:
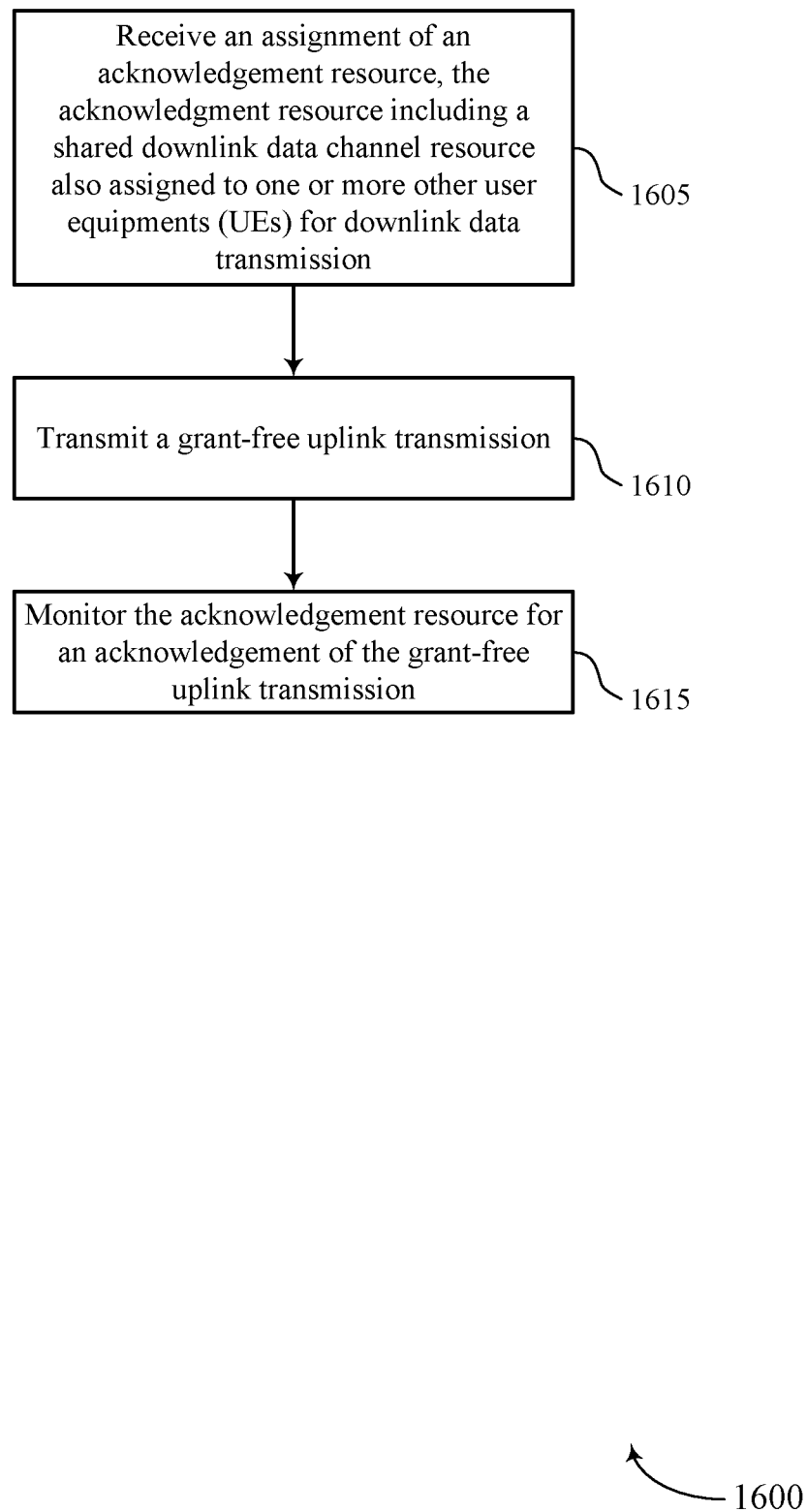

FIG. 16 shows a flowchart illustrating a method 1600 for acknowledgement mechanisms for uplink low latency communications in accordance with aspects of the present disclosure. The operations of method 1600 may be implemented by a URLLC UE 115-*a* or its components as described herein. For example, the operations of method 1600 may be performed by a URLLC UE communications manager as described with reference to FIGS. 9 through 11. In some examples, a URLLC UE 115-*a* may execute a set of codes to control the functional elements of the device to perform the functions described below. Additionally or alternatively, the URLLC UE 115-*a* may perform aspects of the functions described below using special-purpose hardware.

At block 1605 the URLLC UE 115-*a* may receive an assignment of an acknowledgement resource, the acknowledgment resource comprising a shared downlink data channel resource also assigned to one or more other UEs for downlink data transmission. The operations of block 1605 may be performed according to the methods described herein. In certain examples, aspects of the operations of block 1605 may be performed by an acknowledgement resource assignment manager as described with reference to FIGS. 9 through 11.

At block 1610 the URLLC UE 115-*a* may transmit a grant-free uplink transmission. The operations of block 1610 may be performed according to the methods described herein. In certain examples, aspects of the operations of block 1610 may be performed by a URLLC transmission manager as described with reference to FIGS. 9 through 11.

At block 1615 the URLLC UE 115-*a* may monitor the acknowledgement resource for an acknowledgement of the grant-free uplink transmission. The operations of block 1615 may be performed according to the methods described herein. In certain examples, aspects of the operations of block 1615 may be performed by an acknowledgement reception manager as described with reference to FIGS. 9 through 11.

Figure 17:
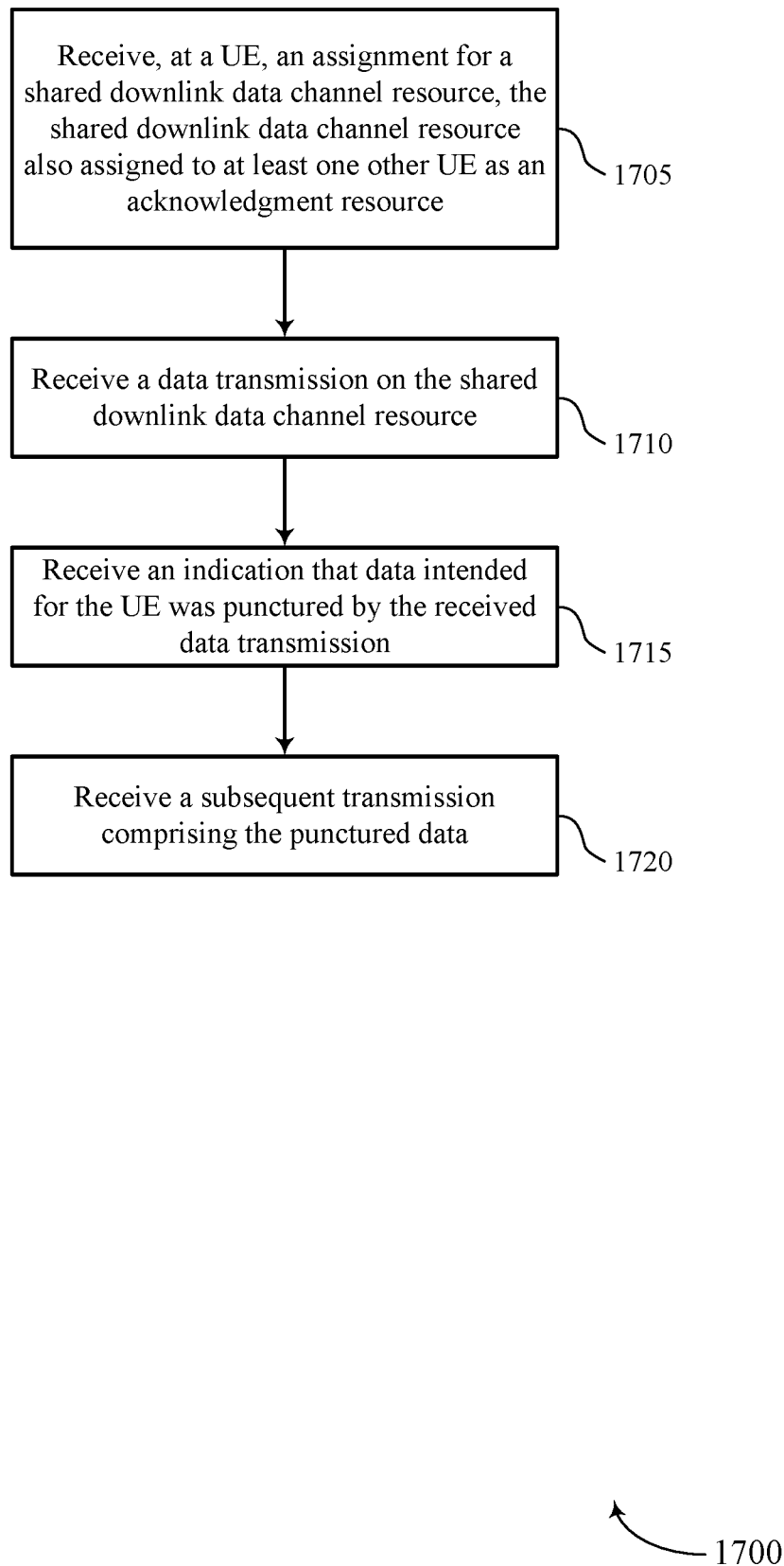

FIG. 17 shows a flowchart illustrating a method 1700 for acknowledgement mechanisms for uplink low latency communications in accordance with aspects of the present disclosure. The operations of method 1700 may be implemented by a non-URLLC UE 115-*b* or its components as described herein. For example, the operations of method 1700 may be performed by a non-URLLC UE communications manager as described with reference to FIGS. 12 through 14. In some examples, a non-URLLC UE 115-*b* may execute a set of codes to control the functional elements of the device to perform the functions described below. Additionally or alternatively, the non-URLLC UE 115-*b* may perform aspects of the functions described below using special-purpose hardware.

At block 1705 the non-URLLC UE 115-*b* may receive an assignment for a shared downlink data channel resource, the shared downlink data channel resource also assigned to at least one other UE as an acknowledgment resource. The operations of block 1705 may be performed according to the methods described herein. In certain examples, aspects of the operations of block 1705 may be performed by a downlink data assignment manager as described with reference to FIGS. 12 through 14.

At block 1710 the non-URLLC UE 115-*b* may receive a data transmission on the shared downlink data channel resource. The operations of block 1710 may be performed according to the methods described herein. In certain examples, aspects of the operations of block 1710 may be performed by a downlink data reception manager as described with reference to FIGS. 12 through 14.

At block 1715 the non-URLLC UE 115-*b* may receive an indication that data intended for the UE was punctured by the received data transmission. The operations of block 1715 may be performed according to the methods described herein. In certain examples, aspects of the operations of block 1715 may be performed by a downlink data reception manager as described with reference to FIGS. 12 through 14.

At block 1720 the non-URLLC UE 115-*b* may receive a subsequent transmission comprising the punctured data. The operations of block 1720 may be performed according to the methods described herein. In certain examples, aspects of the operations of block 1720 may be performed by a downlink data reception manager as described with reference to FIGS. 12 through 14.

Figure 18:
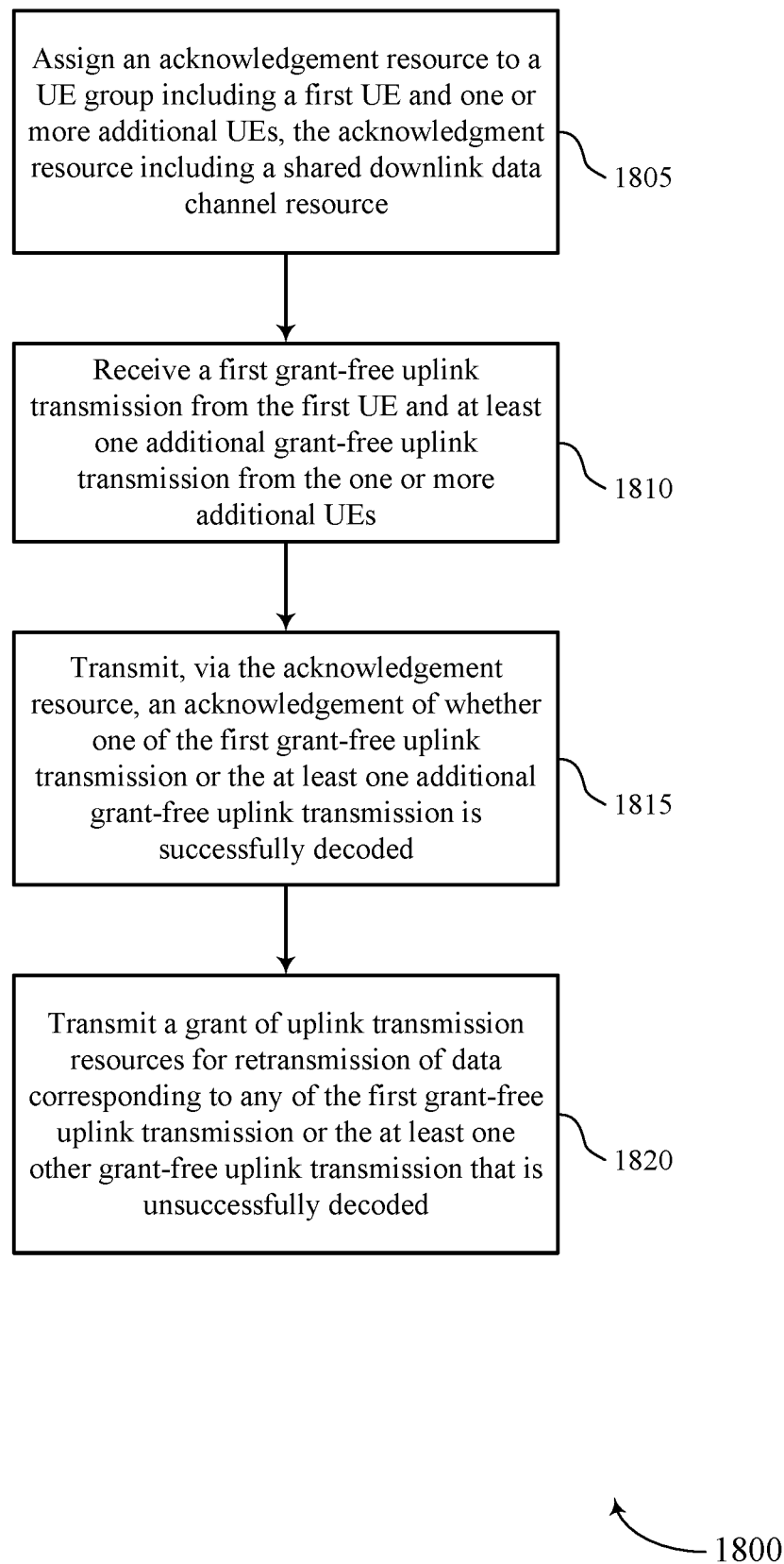

FIG. 18 shows a flowchart illustrating a method 1800 for acknowledgement mechanisms for uplink low latency communications in accordance with aspects of the present disclosure. The operations of method 1800 may be implemented by a base station 105 or its components as described herein. For example, the operations of method 1800 may be performed by a base station communications manager as described with reference to FIGS. 6 through 8. In some examples, a base station 105 may execute a set of codes to control the functional elements of the device to perform the functions described below. Additionally or alternatively, the base station 105 may perform aspects of the functions described below using special-purpose hardware.

At block 1805 the base station 105 may assign an acknowledgement resource to a UE group comprising a first UE and one or more additional UEs, the acknowledgment resource comprising a shared downlink data channel resource. The operations of block 1805 may be performed according to the methods described herein. In certain examples, aspects of the operations of block 1805 may be performed by an acknowledgement resource assignment manager as described with reference to FIGS. 6 through 8.

At block 1810 the base station 105 may receive a first grant-free uplink transmission from the first UE and at least one additional grant-free uplink transmission from the one or more additional UEs. The operations of block 1810 may be performed according to the methods described herein. In certain examples, aspects of the operations of block 1810 may be performed by a reception manager as described with reference to FIGS. 6 through 8.

At block 1815 the base station 105 may transmit, via the acknowledgement resource, an acknowledgement of whether one of the first grant-free uplink transmission or the at least one additional grant-free uplink transmission is successfully decoded. The operations of block 1815 may be performed according to the methods described herein. In certain examples, aspects of the operations of block 1815 may be performed by an acknowledgement transmission manager as described with reference to FIGS. 6 through 8.

At block 1820 the base station 105 may transmit a grant of uplink transmission resources for retransmission of data corresponding to any of the first grant-free uplink transmission or the at least one other grant-free uplink transmission that is unsuccessfully decoded. The operations of block 1820 may be performed according to the methods described herein. In certain examples, aspects of the operations of block 1820 may be performed by a uplink grant transmission manager as described with reference to FIGS. 6 through 8.

Figure 19:
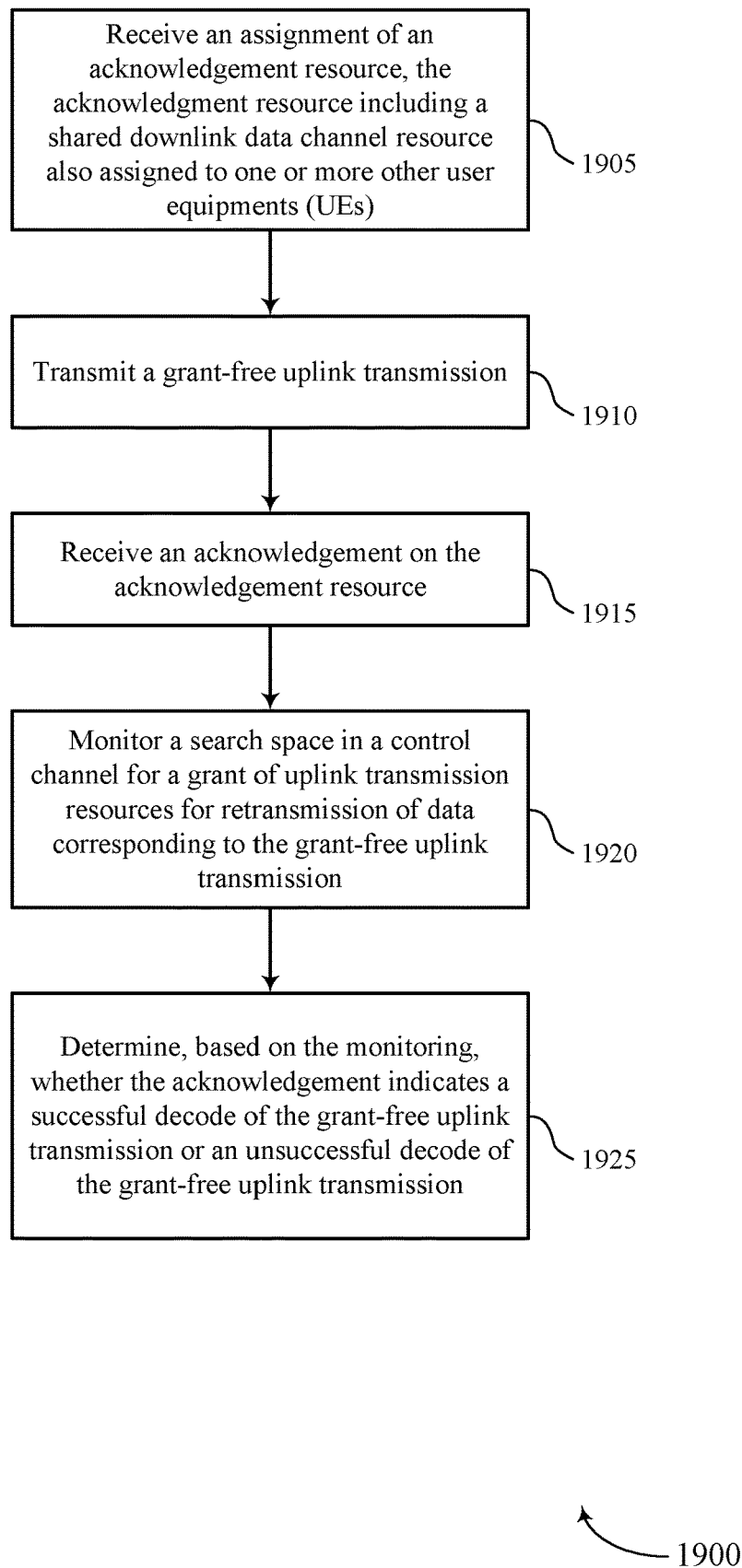

FIG. 19 shows a flowchart illustrating a method 1900 for acknowledgement mechanisms for uplink low latency communications in accordance with aspects of the present disclosure. The operations of method 1900 may be implemented by a URLLC UE 115-*a* or its components as described herein. For example, the operations of method 1900 may be performed by a URLLC UE communications manager as described with reference to FIGS. 9 through 11. In some examples, a URLLC UE 115-*a* may execute a set of codes to control the functional elements of the device to perform the functions described below. Additionally or alternatively, the URLLC UE 115-*a* may perform aspects of the functions described below using special-purpose hardware.

At block 1905 the URLLC UE 115-*a* may receive an assignment of an acknowledgement resource, the acknowledgment resource comprising a shared downlink data channel resource also assigned to one or more other UEs. The operations of block 1905 may be performed according to the methods described herein. In certain examples, aspects of the operations of block 1905 may be performed by an acknowledgement resource assignment manager as described with reference to FIGS. 9 through 11.

At block 1910 the URLLC UE 115-*a* may transmit a grant-free uplink transmission. The operations of block 1910 may be performed according to the methods described herein. In certain examples, aspects of the operations of block 1910 may be performed by a URLLC transmission manager as described with reference to FIGS. 9 through 11.

At block 1915 the URLLC UE 115-*a* may receive an acknowledgement on the acknowledgement resource. The operations of block 1915 may be performed according to the methods described herein. In certain examples, aspects of the operations of block 1915 may be performed by an acknowledgement reception manager as described with reference to FIGS. 9 through 11.

At block 1920 the URLLC UE 115-*a* may monitor a search space in a control channel for a grant of uplink transmission resources for retransmission of data corresponding to the grant-free uplink transmission. The operations of block 1920 may be performed according to the methods described herein. In certain examples, aspects of the operations of block 1920 may be performed by a uplink grant reception manager as described with reference to FIGS. 9 through 11.

At block 1925 the URLLC UE 115-*a* may determine, based at least in part on monitoring the search space, whether the acknowledgement indicates a successful decode of the grant-free uplink transmission or an unsuccessful decode of the grant-free uplink transmission. The operations of block 1925 may be performed according to the methods described herein. In certain examples, aspects of the operations of block 1925 may be performed by a URLLC retransmission manager as described with reference to FIGS. 9 through 11.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   assigning an acknowledgement resource to a user equipment (UE) of a first service type, the acknowledgement resource comprising a shared downlink data channel resource also assigned to one or more other UEs of a second service type different from the first service type for a downlink data transmission, wherein the first service type is associated with a first latency requirement for data communication that has a latency requirement different from a second latency requirement for data communication with which the second service type is associated;
   receiving, from the UE of the first service type, a grant-free uplink transmission; and
   transmitting, to the UE of the first service type via the acknowledgement resource, an acknowledgement of the grant-free uplink transmission, the acknowledgement puncturing the downlink data transmission to the one or more other UEs of the second service type.

2. The method of claim 1, further comprising:
   transmitting to the one or more other UEs of the second service type an indication of the puncturing.

3. The method of claim 2, further comprising:
   transmitting the acknowledgement and transmitting the indication in a same transmission time interval.

4. The method of claim 2, further comprising:
   transmitting the acknowledgement in a first transmission time interval and transmitting the indication in a second transmission time interval, the second transmission time interval subsequent to the first transmission time interval.

5. The method of claim 2, further comprising:
   transmitting the indication via a control channel, a dedicated indication channel, or a combination thereof.

6. The method of claim 2, wherein transmitting the indication of the puncturing comprises:
   transmitting information regarding a subsequent transmission, the subsequent transmission comprising data punctured by the acknowledgement.

7. The method of claim 1, further comprising:
receiving data from the UE of the first service type via one or more transmission resources indicated by the acknowledgement.

8. The method of claim 1, wherein assigning, to the UE of the first service type, the acknowledgement resource comprises:
semi-persistently assigning a UE-specific acknowledgement resource to the UE of the first service type.

9. The method of claim 1, wherein assigning, to the UE of the first service type, the acknowledgement resource comprises:
dynamically assigning the acknowledgement resource to the UE of the first service type.

10. The method of claim 1, wherein:
the grant-free uplink transmission is for ultra-reliable communications, low latency communications, or a combination thereof.

11. The method of claim 1, wherein:
the downlink data transmission is for enhanced mobile broadband communications.

12. The method of claim 1, wherein:
the shared downlink data channel resource comprises a physical downlink shared channel (PDSCH).

13. The method of claim 1, further comprising:
receiving at least one additional grant-free uplink transmission from one or more additional UEs apart from the UE of the first service type;
determining that at least some data received with the at least one additional grant-free uplink transmission from the one or more additional UEs is unsuccessfully decoded; and
transmitting, based at least in part on at least some data being unsuccessfully decoded, a grant of uplink transmission resources in response to the at least one additional grant-free uplink transmission from the one or more additional UEs.

14. The method of claim 13, wherein transmitting the grant of uplink transmission resources comprises:
transmitting the grant of uplink transmission resources within a search space in a control channel along with an indication of whether the grant of uplink transmission resources is for the UE or for the one or more additional UEs apart from the UE of the first service type.

15. A method for wireless communication, comprising:
receiving, by a user equipment (UE) of a first service type, an assignment of an acknowledgement resource, the acknowledgement resource comprising a shared downlink data channel resource available for a downlink data transmission to one or more other UEs of a second service type different from the first service type, wherein the first service type is associated with a first latency requirement for data communication that has a latency requirement different from a second latency requirement for data communication with which the second service type is associated;
transmitting a grant-free uplink transmission;
monitoring the acknowledgement resource for an acknowledgement of the grant-free uplink transmission; and
receiving, from a base station via the acknowledgement resource, the acknowledgement of the grant-free uplink transmission, the acknowledgement puncturing the downlink data transmission to the one or more other UEs of the second service type.

16. The method of claim 15,
wherein the acknowledgement comprises a negative acknowledgement indicating that the grant-free uplink transmission was not successfully received, and the method further comprising:
retransmitting data corresponding to the grant-free uplink transmission.

17. The method of claim 16, wherein retransmitting data corresponding to the grant-free uplink transmission comprises:
retransmitting data corresponding to the grant-free uplink transmission using one or more transmission resources indicated by the acknowledgement.

18. The method of claim 15,
wherein the acknowledgement comprises an affirmative acknowledgement that the grant-free uplink transmission was successfully received and the method further comprising:
transmitting data using one or more transmission resources indicated by the acknowledgement.

19. The method of claim 15, wherein receiving the assignment of the acknowledgement resource comprises:
receiving a semi-persistent assignment of a UE-specific acknowledgement resource.

20. The method of claim 15, wherein receiving the assignment of the acknowledgement resource comprises:
receiving a dynamic assignment of the acknowledgement resource.

21. The method of claim 15, wherein:
the shared downlink data channel resource comprises a physical downlink shared channel (PDSCH).

22. The method of claim 15, further comprising:
monitoring, based at least in part on receiving the acknowledgement of the grant-free uplink transmission, a search space in a control channel for a grant of uplink transmission resources for retransmission of data corresponding to the grant-free uplink transmission; and
determining, based at least in part on monitoring the search space, whether the acknowledgement indicates a successful decode of the grant-free uplink transmission or an unsuccessful decode of the grant-free uplink transmission.

23. The method of claim 22, further comprising:
determining that the acknowledgement indicates the unsuccessful decode of the grant-free uplink transmission based at least in part on determining that the search space includes the grant of uplink transmission resources for retransmission of data corresponding to the grant-free uplink transmission.

24. The method of claim 23, further comprising:
retransmitting data corresponding to the grant-free uplink transmission using uplink transmission resources granted by the grant of uplink transmission resources.

25. A method for wireless communication at a user equipment (UE) of a second service type different from a first service type, comprising:
receiving, by the UE of the second service type, an assignment for a shared downlink data channel resource, the shared downlink data channel resource also assigned to at least one other UE of the first service type as an acknowledgement resource, wherein the first service type is associated with a first latency requirement for data communication that has a latency requirement different from a second latency requirement for data communication with which the second service type is associated;

receiving a data transmission on the shared downlink data channel resource;

receiving an indication that data intended for the UE of the second service type was punctured by the received data transmission; and receiving a subsequent transmission comprising the punctured data.

26. The method of claim 25, further comprising:

discarding the data transmission based at least in part on the indication.

27. The method of claim 25, further comprising:

receiving the indication via a control channel, a dedicated indication channel, or a combination thereof.

28. The method of claim 25, wherein receiving the indication comprises:

receiving information regarding one or more transmission resources to be used for the subsequent transmission.

29. The method of claim 25, wherein:

the shared downlink data channel resource comprises a physical downlink shared channel (PDSCH).

30. An apparatus for wireless communication, comprising:

a processor;

memory coupled to the processor; and instructions stored in the memory and operable, when executed by the processor, to cause the apparatus to:

receive, by a user equipment (UE) of a first service type, an assignment of an acknowledgement resource, the acknowledgement resource comprising a shared downlink data channel resource available for a downlink data transmission to one or more other UEs of a second service type different from the first service type, wherein the first service type is associated with a first latency requirement for data communication that has a latency requirement different from a second latency requirement for data communication with which the second service type is associated;

transmit a grant-free uplink transmission;

monitor the acknowledgement resource for an acknowledgement of the grant-free uplink transmission; and receive, from a base station via the acknowledgement resource, the acknowledgement of the grant-free uplink transmission, the acknowledgement puncturing the downlink data transmission to the one or more other UEs of the second service type.

\* \* \* \* \*